United States Patent
Choi et al.

(10) Patent No.: US 11,677,955 B2
(45) Date of Patent: Jun. 13, 2023

(54) IMAGE DECODING METHOD FOR CODING RESIDUAL INFORMATION ON BASIS OF HIGH FREQUENCY ZEROING IN IMAGE CODING SYSTEM, AND DEVICE THEREFOR

(71) Applicant: LG Electronics Inc., Seoul (KR)

(72) Inventors: Jungah Choi, Seoul (KR); Jaehyun Lim, Seoul (KR); Jin Heo, Seoul (KR); Sunmi Yoo, Seoul (KR); Ling Li, Seoul (KR); Jangwon Choi, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/419,650

(22) PCT Filed: Jan. 13, 2020

(86) PCT No.: PCT/KR2020/000587
§ 371 (c)(1),
(2) Date: Jun. 29, 2021

(87) PCT Pub. No.: WO2020/149594
PCT Pub. Date: Jul. 23, 2020

(65) Prior Publication Data
US 2022/0078432 A1    Mar. 10, 2022

Related U.S. Application Data

(60) Provisional application No. 62/792,852, filed on Jan. 15, 2019.

(51) Int. Cl.
*H04N 19/132* (2014.01)
*H04N 19/176* (2014.01)
(Continued)

(52) U.S. Cl.
CPC ......... *H04N 19/132* (2014.11); *H04N 19/176* (2014.11); *H04N 19/18* (2014.11); *H04N 19/46* (2014.11); *H04N 19/70* (2014.11)

(58) Field of Classification Search
CPC .... H04N 19/132; H04N 19/176; H04N 19/18; H04N 19/46; H04N 19/70
See application file for complete search history.

(56) References Cited

U.S. PATENT DOCUMENTS

2012/0082232 A1*  4/2012  Sole Rojals ......... H04N 19/146
375/240.18
2015/0264403 A1*  9/2015  Chong ................. H04N 19/132
375/240.18

FOREIGN PATENT DOCUMENTS

| KR | 20130095310 | 8/2013 |
| KR | 20140028118 | 3/2014 |

(Continued)

*Primary Examiner* — Jae N Noh
(74) *Attorney, Agent, or Firm* — Fish & Richardson P.C.

(57) ABSTRACT

A method by which a decoding device decodes an image, according to the present document, comprises the steps of: receiving a bitstream including residual information about a current block; decoding syntax elements for the current block included in the residual information; deriving conversion coefficients for the current block on the basis of the decoded syntax elements; deriving residual samples for the current block on the basis of the conversion coefficients; and generating a restoration picture on the basis of the residual samples.

13 Claims, 17 Drawing Sheets

(51) Int. Cl.
*H04N 19/18* (2014.01)
*H04N 19/46* (2014.01)
*H04N 19/70* (2014.01)

(56) References Cited

FOREIGN PATENT DOCUMENTS

| | | |
|---|---|---|
| KR | 20150039721 | 4/2015 |
| KR | 20160134702 | 11/2016 |
| KR | 20180095952 | 8/2018 |

\* cited by examiner

IMAGE DECODING METHOD FOR CODING RESIDUAL INFORMATION ON BASIS OF HIGH FREQUENCY ZEROING IN IMAGE CODING SYSTEM, AND DEVICE THEREFOR

CROSS-REFERENCE TO RELATED APPLICATIONS

This application is a National Stage application under 35 U.S.C. § 371 of International Application No. PCT/KR2020/000587, filed on Jan. 13, 2020, which claims the benefit of U.S. Provisional Application No. 62/792,852, filed on Jan. 15, 2019. The disclosures of the prior applications are incorporated by reference in their entirety.

BACKGROUND OF THE DISCLOSURE

Field of the Disclosure

The present specification relates to an image coding technology and, most particularly, to an image decoding method and apparatus for coding residual information based on high frequency zeroing in an image coding system.

Related Art

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY OF THE DISCLOSURE

Technical Objects

A technical object of the present specification is to provide a method and apparatus for enhancing image coding efficiency.

Another technical object of the present specification is to provide a method and apparatus for enhancing efficiency of residual coding.

Another technical object of the present specification is to provide a method and apparatus for enhancing residual coding efficiency by coding a transform coefficient based on high frequency zeroing.

Another technical object of the present specification is to provide a method and apparatus for coding position information of a last significant coefficient within a current block (or current transform block) based on high frequency zeroing.

A further technical object of the present specification is to provide a method and apparatus for deriving a context model of information indicating a last significant transform coefficient based on a size of a region where the high frequency zeroing is not applied in the current block, when coding transform coefficients for the current block (or current transform block) based on high frequency zeroing.

Technical Solutions

According to an embodiment of the present specification, provided herein is an image decoding method performed by a decoding apparatus. The image decoding method may include the steps of receiving bitstream including residual information of a current block, decoding syntax elements for the current block included in the residual information, deriving transform coefficients for the current block based on the decoded syntax elements, deriving residual samples for the current block based on the transform coefficients, and generating a reconstructed picture based on the residual samples, wherein each of the transform coefficients for the current block is related to a high-frequency transform coefficient region consisting of zero transform coefficients or a low-frequency transform coefficient region including at least one significant transform coefficient, wherein the syntax elements include last significant coefficient prefix information for a position of a last significant transform coefficient among the transform coefficients for the current block, and wherein a context model for the significant coefficient prefix information is derived based on a height and width of the low-frequency transform coefficient region.

According to another embodiment of the present specification, provided herein is a decoding apparatus performing an image decoding method. The decoding apparatus may include an entropy decoder receiving bitstream including residual information of a current block, decoding syntax elements for the current block included in the residual information, and deriving transform coefficients for the current block based on the decoded syntax elements, an inverse transformer deriving residual samples for the current block based on the transform coefficients, and an adder generating a reconstructed picture based on the residual samples, wherein each of the transform coefficients for the current block is related to a high-frequency transform coefficient region consisting of zero transform coefficients or a low-frequency transform coefficient region including at least one significant transform coefficient, wherein the syntax elements include last significant coefficient prefix information for a position of a last significant transform coefficient among the transform coefficients for the current block, and wherein a context model for the significant coefficient prefix information is derived based on a height and width of the low-frequency transform coefficient region.

According to yet another embodiment of the present specification, provided herein is an image encoding method performed by an encoding apparatus. The image encoding method may include the steps of deriving residual samples for a current block, deriving transform coefficients of the current block based on the residual samples, and encoding residual information for the current block including syntax elements for the transform coefficients, wherein each of the transform coefficients for the current block is related to a high-frequency transform coefficient region consisting of zero transform coefficients or a low-frequency transform coefficient region including at least one significant transform coefficient, wherein the syntax elements include last significant coefficient prefix information for a position of a last significant transform coefficient among the transform coefficients for the current block, and wherein a context model for the significant coefficient prefix information is derived based on a height and width of the low-frequency transform coefficient region.

According to yet another embodiment of the present specification, provided herein is an encoding apparatus performing an image encoding method. The encoding apparatus may include a subtractor deriving residual samples for a current block, a transformer deriving transform coefficients of the current block based on the residual samples, and an entropy encoder encoding residual information for the current block including syntax elements for the transform coefficients, wherein each of the transform coefficients for the current block is related to a high-frequency transform coefficient region consisting of zero transform coefficients or a low-frequency transform coefficient region including at least one significant transform coefficient, wherein the syntax elements include last significant coefficient prefix information for a position of a last significant transform coefficient among the transform coefficients for the current block, and wherein a context model for the significant coefficient prefix information is derived based on a height and width of the low-frequency transform coefficient region.

Effects of the Disclosure

According to the present specification, efficiency of residual coding may be enhanced.

According to the present specification, residual coding efficiency may be enhanced by coding a transform coefficient based on high frequency zeroing.

According to the present specification image coding efficiency may be enhanced by coding position information of a last significant coefficient within a current block (or current transform block) based on high frequency zeroing.

According to the present specification, throughput of CABAC may be enhanced by performing more efficient encoding after determining a context model on position information of a last significant transform coefficient based on a size of a high frequency zeroing region (i.e., a region where high frequency zeroing is not applied), and by reducing a number of context-coded bins.

DESCRIPTION OF EXEMPLARY EMBODIMENTS

Figure 1:
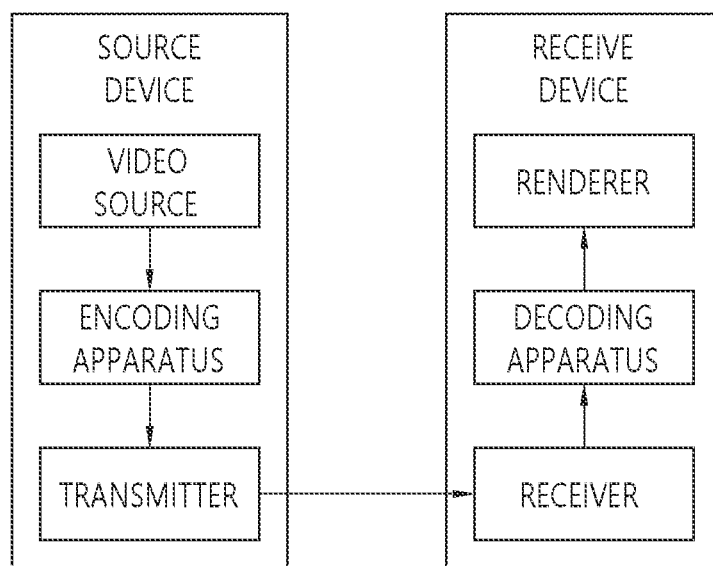
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, same reference numerals are used to indicate same elements throughout the drawings, and the overlapping descriptions on the same elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present disclosure relates to video/image coding. For example, the methods/embodiments disclosed in the present disclosure may be applied to a method disclosed in the versatile video coding (VVC), the essential video coding (EVC) standard, the AOMedia Video 1 (AV1) standard, the 2nd generation of audio video coding standard (AVS2), or the next generation video/image coding standard (e.g., H.267 or H.268, and so on).

The present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

In the present disclosure, the term "/" and "," should be interpreted to indicate "and/or". For instance, the expression "A/B" may mean "A and/or B". Further, "A, B" may mean "A and/or B". Further, "A/B/C" may mean "at least one of A, B, and/or C". Also, "A/B/C" may mean "at least one of A, B, and/or C".

Further, in the document, the term "or" should be interpreted to indicate "and/or". For instance, the expression "A or B" may comprise 1) only A, 2) only B, and/or 3) both A and B. In other words, the term "or" in the present disclosure should be interpreted to indicate "additionally or alternatively."

Figure 2:
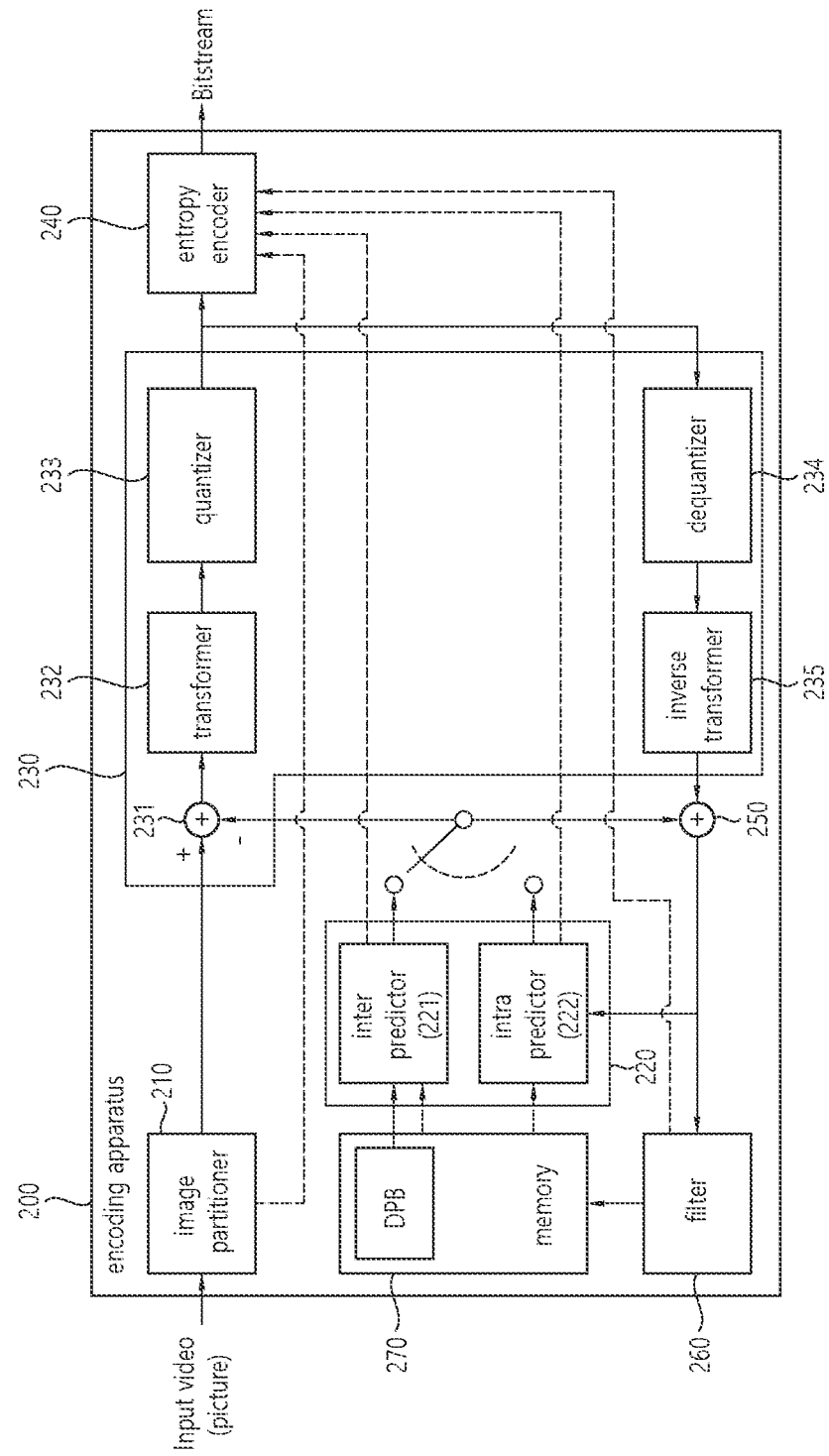
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus (200) includes an image partitioner (210), a predictor (220), a residual processor (230), and an entropy encoder (240), an adder (250), a filter (260), and a memory (270). The predictor (220) may include an inter predictor (221) and an intra predictor (222). The residual processor (230) may include a transformer (232), a quantizer (233), a dequantizer (234), and an inverse transformer (235). The residual processor (230) may further include a subtractor (231). The adder (250) may be called a reconstructor or a reconstructed block generator. The image partitioner (210), the predictor (220), the residual processor (230), the entropy encoder (240), the adder (250), and the filter (260) may be configured by at least one hardware component (e.g., an encoder chipset or processor) according to an embodiment. In addition, the memory (270) may include a decoded picture buffer (DPB) or may be configured by a digital storage medium. The hardware component may further include the memory (270) as an internal/external component.

The image partitioner (210) may partition an input image (or a picture or a frame) input to the encoding apparatus (200) into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus (200), a prediction signal (predicted block, prediction sample array) output from the inter predictor (221) or the intra predictor (222) is subtracted from an input image signal (original block, original sample array) to generate a residual signal residual block, residual sample array), and the generated residual signal is transmitted to the transformer (232). In this case, as shown, a unit for subtracting a prediction signal (predicted block, prediction sample array) from the input image signal (original block, original sample array) in the encoder (200) may be called a subtractor (231). The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder (240). The information on the prediction may be encoded in the entropy encoder (240) and output in the form of a bitstream.

The intra predictor (222) may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor (222) may determine the prediction mode applied to the current block by using a prediction mode applied to a neighboring block.

The inter predictor (221) may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, and so on) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor (221) may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor (221) may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor (220) may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor (221) and/or the intra predictor (222)) may be used to generate a reconstructed signal or to generate a residual signal. The transformer (232) may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer (233) may quantize the transform coefficients and transmit them to the entropy encoder (240), and the entropy encoder (240) may encode the quantized signal (information on the quantized transform coefficients) and output a bitstream. The information on the quantized transform coefficients may be referred to as residual information. The quantizer (233) may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder (240) may perform various encoding methods such as, for example, exponential Golomb, context-adaptive variable length coding (CAVLC), context-adaptive binary arithmetic coding (CABAC), and the like. The entropy encoder (240) may encode information necessary for video/image reconstruction other than quantized transform coefficients (e.g., values of syntax elements, and so on) together or separately. Encoded information (e.g., encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder (240) and/or a storage unit (not shown) storing the signal may be included as internal/external element of the encoding apparatus (200), and, alternatively, the transmitter may be included in the entropy encoder (240).

The quantized transform coefficients output from the quantizer (233) may be used to generate a prediction signal. For example, the residual signal (residual block or residual samples) may be reconstructed by applying dequantization and inverse transform to the quantized transform coefficients through the dequantizer (234) and the inverse transformer (235). The adder (250) adds the reconstructed residual signal to the prediction signal output from the inter predictor (221) or the intra predictor (222) to generate a reconstructed signal (reconstructed picture, reconstructed block, reconstructed sample array). If there is no residual for the block to be processed, such as a case where the skip mode is applied, the predicted block may be used as the reconstructed block. The adder (250) may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter (260) may improve subjective/objective image quality by applying filtering to the reconstructed signal. For example, the filter (260) may generate a modified reconstructed picture by applying various filtering methods to the reconstructed picture and store the modified reconstructed picture in the memory (270), specifically, a DPB of the memory (270). The various filtering methods may include, for example, deblocking filtering, a sample adaptive offset, an adaptive loop filter, a bilateral filter, and the like. The filter (260) may generate various information related to the filtering and transmit the generated information to the entropy encoder (240) as described later in the description of each filtering method. The information related to the filtering may be encoded by the entropy encoder (240) and output in the form of a bitstream.

The modified reconstructed picture transmitted to the memory (270) may be used as the reference picture in the inter predictor (221). When the inter prediction is applied through the encoding apparatus, prediction mismatch between the encoding apparatus (200) and the decoding apparatus (300) may be avoided and encoding efficiency may be improved.

The DPB of the memory (270) DPB may store the modified reconstructed picture for use as a reference picture in the inter predictor (221). The memory (270) may store the motion information of the block from which the motion information in the current picture is derived (or encoded) and/or the motion information of the blocks in the picture that have already been reconstructed. The stored motion information may be transmitted to the inter predictor (221) and used as the motion information of the spatial neighboring block or the motion information of the temporal neighboring block. The memory (270) may store reconstructed samples of reconstructed blocks in the current picture and may transfer the reconstructed samples to the intra predictor (222).

Figure 3:
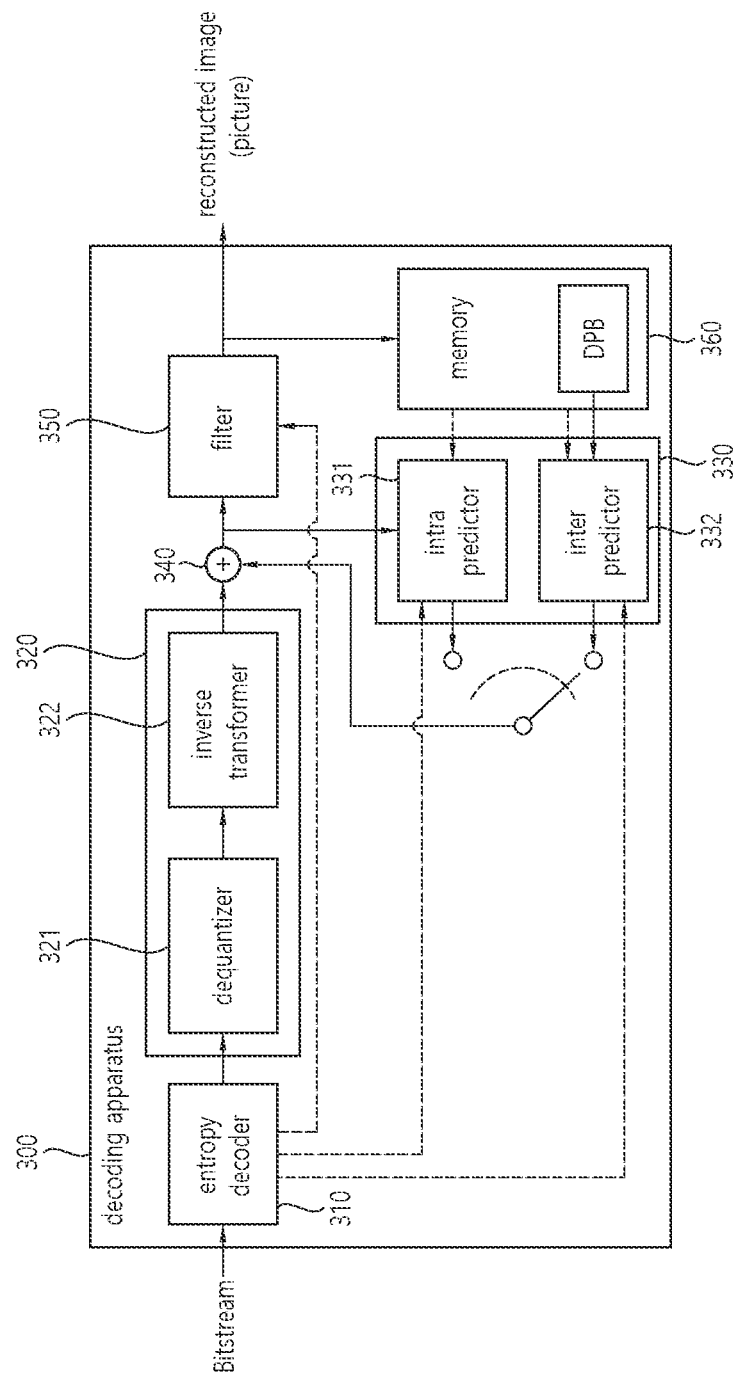
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus (300) may include an entropy decoder (310), a residual processor (320), a predictor (330), an adder (340), a filter (350), a memory (360). The predictor (330) may include an inter predictor (331) and an intra predictor (332). The residual processor (320) may include a dequantizer (321) and an inverse transformer (321). The entropy decoder (310), the residual processor (320), the predictor (330), the adder (340), and the filter (350) may be configured by a hardware component (e.g., a decoder chipset or a processor) according to an embodiment. In addition, the memory (360) may include a decoded picture buffer (DPB) or may be configured by a digital storage medium. The hardware component may further include the memory (360) as an internal/external component.

When a bitstream including video/image information is input, the decoding apparatus (300) may reconstruct an image corresponding to a process in which the video/image information is processed in the encoding apparatus of FIG. 2. For example, the decoding apparatus (300) may derive units/blocks based on block partition related information obtained from the bitstream. The decoding apparatus (300) may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus (300) may be reproduced through a reproducing apparatus.

The decoding apparatus (300) may receive a signal output from the encoding apparatus of FIG. 2 in the form of a bitstream, and the received signal may be decoded through the entropy decoder (310). For example, the entropy decoder (310) may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder (310) decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder (310) may be provided to the predictor (the inter predictor (332) and the intra predictor (331)), and the residual value on which the entropy decoding was performed in the entropy decoder (310), that is, the quantized transform coefficients and related parameter information, may be input to the residual processor (320). The residual processor (320) may derive the residual signal (the residual block, the residual samples, the residual sample array). In addition, information on filtering among information decoded by the entropy decoder (310) may be provided to the filter (350). Meanwhile, a receiver (not shown) for receiving a signal output from the encoding apparatus may be further configured as an internal/external element of the decoding apparatus (300), or the receiver may be a component of the entropy decoder (310). Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder (310), and the sample decoder may include at least one of the dequantizer (321), the inverse transformer (322), the adder (340), the filter (350), the memory (360), the inter predictor (332), and the intra predictor (331).

The dequantizer (321) may dequantize the quantized transform coefficients and output the transform coefficients. The dequantizer (321) may rearrange the quantized transform coefficients in the form of a two-dimensional block form. In this case, the rearrangement may be performed based on the coefficient scanning order performed in the encoding apparatus. The dequantizer (321) may perform dequantization on the quantized transform coefficients by using a quantization parameter (e.g., quantization step size information) and obtain transform coefficients.

The inverse transformer (322) inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder (310) and may determine a specific intra/inter prediction mode.

The predictor (320) may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor (331) may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor (331) may determine the prediction mode applied to the current block by using a prediction mode applied to a neighboring block.

The inter predictor (332) may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, and so on) information. In the case of inter prediction, the neighboring block may include a spatial neighboring block present in the current picture and a temporal neighboring block present in the reference picture. For example, the inter predictor (332) may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder (340) may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter (350) may improve subjective/objective image quality by applying filtering to the reconstructed signal. For example, the filter (350) may generate a modified reconstructed picture by applying various filtering methods to the reconstructed picture and store the modified reconstructed picture in the memory (360), specifically, a DPB of the memory (360). The various filtering methods may include, for example, deblocking filtering, a sample adaptive offset, an adaptive loop filter, a bilateral filter, and the like.

The (modified) reconstructed picture stored in the DPB of the memory (360) may be used as a reference picture in the inter predictor (332). The memory (360) may store the motion information of the block from which the motion information in the current picture is derived (or decoded) and/or the motion information of the blocks in the picture that have already been reconstructed. The stored motion information may be transmitted to the inter predictor (332) so as to be utilized as the motion information of the spatial neighboring block or the motion information of the temporal neighboring block. The memory (360) may store reconstructed samples of reconstructed blocks in the current picture and transfer the reconstructed samples to the intra predictor (331).

In the present disclosure, the embodiments described in the filter (260), the inter predictor (221), and the intra predictor (222) of the encoding apparatus (200) may be the same as or respectively applied to correspond to the filter (350), the inter predictor (332), and the intra predictor (331) of the decoding apparatus (300). The same may also apply to the unit (332) and the intra predictor (331).

As described above, the encoding apparatus may perform various encoding methods such as exponential Golomb, context-adaptive variable length coding (CAVLC), and context-adaptive binary arithmetic coding (CABAC). In addition, the decoding apparatus may decode information in a bitstream based on a coding method such as exponential Golomb coding, CAVLC or CABAC, and output a value of a syntax element required for image reconstruction and quantized values of transform coefficients related to residuals.

For example, the coding methods described above may be performed as described below.

Figure 4:
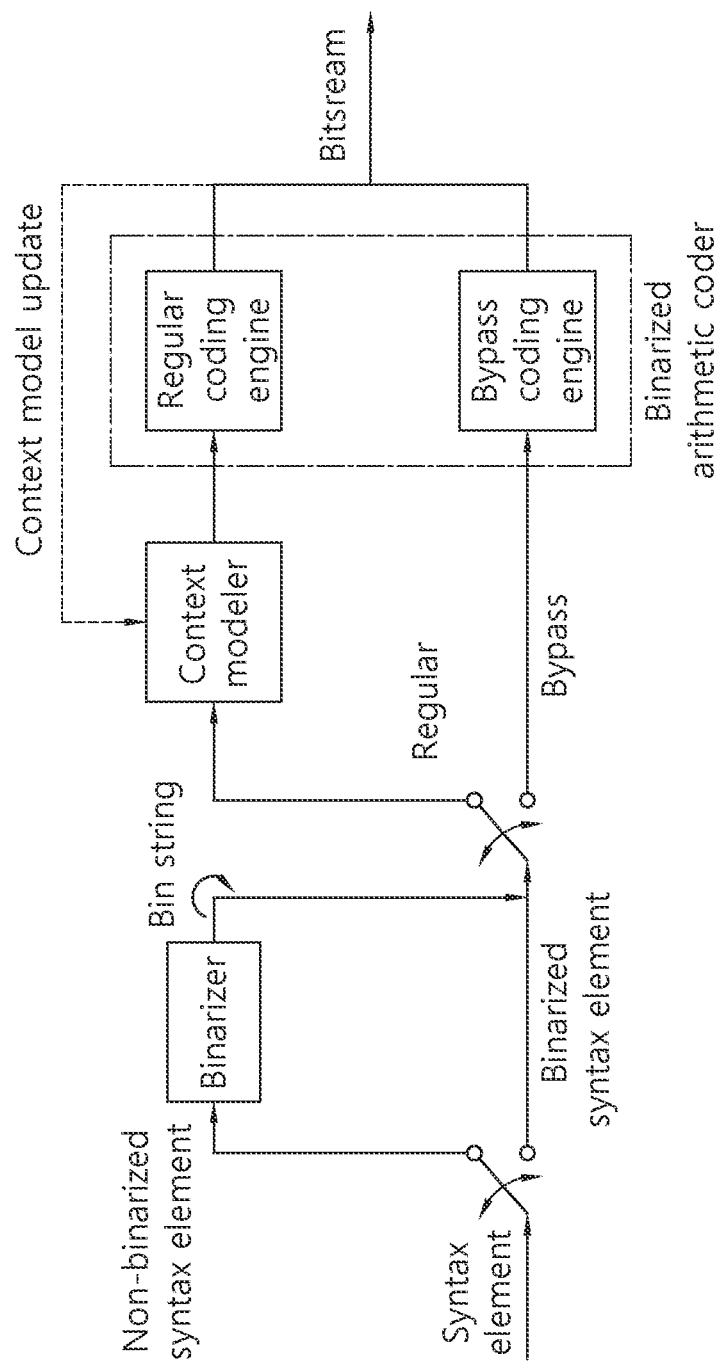
FIG. 4 exemplarily shows context-adaptive binary arithmetic coding (CABAC) for encoding a syntax element.

FIG. 4 exemplarily shows context-adaptive binary arithmetic coding (CABAC) for encoding a syntax element. For example, in the CABAC encoding process, when an input signal is a syntax element, rather than a binary value, the encoding apparatus may convert the input signal into a binary value by binarizing the value of the input signal. In addition, when the input signal is already a binary value (i.e., when the value of the input signal is a binary value), binarization may not be performed and may be bypassed. Here, each binary number 0 or 1 constituting a binary value may be referred to as a bin. For example, if a binary string after binarization is 110, each of 1, 1, and 0 is called one bin. The bin(s) for one syntax element may indicate a value of the syntax element.

Thereafter, the binarized bins of the syntax element may be input to a regular coding engine or a bypass coding engine. The regular coding engine of the encoding apparatus may allocate a context model reflecting a probability value to the corresponding bin, and may encode the corresponding bin based on the allocated context model. The regular coding engine of the encoding apparatus may update a context model for each bin after performing encoding on each bin. A bin encoded as described above may be referred to as a context-coded bin.

Meanwhile, when the binarized bins of the syntax element are input to the bypass coding engine, they may be coded as follows. For example, the bypass coding engine of the encoding apparatus omits a procedure of estimating a probability with respect to an input bin and a procedure of updating a probability model applied to the bin after encoding. When bypass encoding is applied, the encoding apparatus may encode the input bin by applying a uniform probability distribution instead of allocating a context model, thereby improving an encoding rate. The bin encoded as described above may be referred to as a bypass bin.

Entropy decoding may represent a process of performing the same process as the entropy encoding described above in reverse order.

For example, when a syntax element is decoded based on a context model, the decoding apparatus may receive a bin corresponding to the syntax element through a bitstream, determine a context model using the syntax element and decoding information of a decoding target block or a neighbor block or information of a symbol/bin decoded in a previous stage, predict an occurrence probability of the received bin according to the determined context model, and perform an arithmetic decoding on the bin to derive a value of the syntax element. Thereafter, a context model of a bin which is decoded next may be updated with the determined context model.

Also, for example, when a syntax element is bypass-decoded, the decoding apparatus may receive a bin corresponding to the syntax element through a bitstream, and decode the input bin by applying a uniform probability distribution. In this case, the procedure of the decoding apparatus for deriving the context model of the syntax element and the procedure of updating the context model applied to the bin after decoding may be omitted.

As described above, residual samples may be derived as quantized transform coefficients through transform and quantization processes. The quantized transform coefficients may also be referred to as transform coefficients. In this case, the transform coefficients in a block may be signaled in the form of residual information. The residual information may include a residual coding syntax. That is, the encoding apparatus may configure a residual coding syntax with residual information, encode the same, and output it in the form of a bitstream, and the decoding apparatus may decode the residual coding syntax from the bitstream and derive residual (quantized) transform coefficients. The residual coding syntax may include syntax elements representing whether transform was applied to the corresponding block, a location of a last effective transform coefficient in the block, whether an effective transform coefficient exists in the subblock, a size/sign of the effective transform coefficient, and the like, as will be described later.

For example, the (quantized) transformation coefficients (i.e., the residual information) may be encoded and/or decoded based on syntax elements such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, rem_abs_gt1_flag, rem_abs_gt2_flag, abs_remainder, coeff_sign_flag, dec_abs_level, mts_idx. Syntax elements related to residual data encoding/decoding may be represented as shown in the following table.

TABLE 1

| | Descriptor |
|---|---|
| residual coding( x0, y0, log2tbWidth, log2TbHeight, cIdx ) { | |
|     if( transform_skip_enabled_flag && ( cIdx ! – 0 | | cu_mts_flag[ x0 ][ y0 ] – – 0 ) && | |
|         ( log2tbWidth <= 2 ) && ( log2tbHeight <= 2 ) ) | |
|         transform skip flag[ x0 ][ y0 ][ cIdx ] | ae(v) |
|     last sig coeff x prefix | ae(v) |
|     last sig coeff y prefix | ae(v) |
|     if( last sig coeff x prefix > 3 ) | |
|         last sig coeff x suffix | ae(v) |
|     if( last sig coeff y prefix > 3 ) | |
|         last sig coeff y suffix | ae(v) |
|     log2SbSize = ( Min( log2TbWidth, log2TbHeight ) < 2 ? 1 : 2 ) | |
|     numSbCoeff = 1 << ( log2SbSize << 1 ) | |
|     lastScanPos = numSbCoeff | |
|     lastSubBlock = ( 1 << ( log2TbWidth + log2TbHeight – 2 * log2SbSize ) ) – 1 | |
|     do { | |
|         if( lastScanPos = = 0 ) { | |
|             lastScanPos = numSbCoeff | |
|             lastSubBlock– – | |
|         } | |
|         lastScanPos– – | |
|         xS = DiagScanOrder[ log2TbWidth – log2SbSize ][ log2TbHeight – log2SbSize ] | |
|             [ lastSubBlock ][ 0 ] | |
|         yS = DiagScanOrder[ log2TbWidth – log2SbSize ][ log2TbHeight – log2SbSize ] | |
|             [ lastSubBlock ][ 1 ] | |
|         xC = ( xS << log2SbSize ) + | |
|             DiagScanOrder[ log2SbSize ][ log2SbSize ][ lastScanPos ][ 0 ] | |
|         yC = ( yS << log2SbSize ) + | |
|             DiagScanOrder[ log2SbSize ][ log2SbSize ][ lastScanPos ][ 1 ] | |
|     } while( ( xC != LastSignificantCoeffX ) | ( yC != LastSignificantCoeffY ) ) | |
|     numSigCoeff = 0 | |
|     QState = 0 | |
|     for( i = lastSubBlock; i >= 0; i– – ) { | |
|         startQStateSb = QState | |
|         xS = DiagScanOrder[ log2TbWidth – log2SbSize ][ log2TbHeight – log2SbSize ] | |
|             [ lastSubBlock ][ 0 ] | |
|         yS – DiagScanOrder[ log2TbWidth – log2SbSize ][ log2TbHeight – log2SbSize ] | |
|             [ lastSubBlock ][ 1 ] | |
|         inferSbDcSigCoeffFlag – 0 | |
|         if( ( i < lastSubBlock ) && ( i > 0 ) ) { | |
|             coded_sub_block_flag[ xS ][ yS ] | ae(v) |
|             inferSbDcSigCoeffFlag = 1 | |
|         } | |
|         firstSigScanPosSb = numSbCoeff | |
|         lastSigScanPosSb = –1 | |
|         remBinsPass1 = ( log2SbSize < 2 ? 6 : 28 ) | |
|         remBinsPass2 = ( log2SbSize < 2 ? 2 : 4 ) | |
|         firstPosMode0 = ( i = = lastSubBlock ? lastScanPos – 1 : numSbCoeff – 1 ) | |
|         FirstPosMode1 – –1 | |
|         firstPosMode2 = –1 | |
|         for( n = firstPosMode0; n >= 0 && remBinsPass1 >= 3; n– – ) { | |
|             xC = ( xS << log2SbSize ) – DiagScanOrder[ log2SbSize ][ log2SbSize ][ n ][ 0 ] | |
|             yC = ( yS << log2SbSize ) – DiagScanOrder[ log2SbSize ][ log2SbSize ][ n ][ 1 ] | |

TABLE 1-continued

| | Descriptor |
|---|---|
| ```
        if( coded_sub_block_flag[ xS ][ yS ] && ( n > 0 | | !inferSbDcSigCoeffFlag ) ) {
            sig_coeff_flag[ xC ][ yC ]
            remBinsPass1- -
            if( sig_coeff_flag[ xC ][ yC ] )
                inferSbDcSigCoeffFlag = 0
        }
        if( sig_coeff_flag[ xC ][ yC ] ) {
            numSigCoeff++
            abs_level_gt1_flag[ n ]
            remBinsPass1
            if( abs_level_gt1_flag[ n ] ) {
                par_level_flag[ n ]
                remBinsPass1- -
                if( remBinsPass2 > 0 ) {
                    remBinsPass2- -
                    if( remBinsPass2 = = 0 )
                        firstPosMode1 = n   1
                }
            }
            if( lastSigScanPosSb == -1 )
                lastSigScanPosSb = n
            firstSigScanPosSb = n
        }
        AbsLevelPass1[ xC ][ yC ] =
            sig coeff flag[ xC ][ yC ] + par level flag[ n ] + abs level gt1 flag[ n ]
        if( dep quant enabled flag )
            QState = QStateTransTable[ QState ][ AbsLevelPass1[ xC ][ yC ] & 1 ]
        if( remBinsPass1 < 3 )
            firstPosMode2 − n − 1
    }
    if( firstPosMode1 < firstPosMode2 )
        firstPosMode1 = firstPosMode2
    for( n = numSbCoeff − 1; n > firstPosMode1; n- - ) {
        if( abs level gt1 flag[ n ] )
            abs level gt2 flag[ n ]
    }
    for( n = numSbCoeff   1; n > firstPosMode1; n   ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( abs level gt3 flag[ n ] )
            abs remainder[ n ]
        AbsLevel[ xC ][ yC ] − AbsLevelPass1[ xC ][ yC ] +
                                2 * ( abs level gt3 flag[ n ] + abs remainder[ n ] )
    }
    for( n = firstPosMode1; n > firstPosMode2; n- - ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( abs level gt1 flag[ n ] )
            abs remainder[ n ]
        AbsLevel[ xC ][ yC ] = AbsLevelPass1[ xC ][ yC ] | 2 * abs remainder[ n ]
    }
    for( n = firstPosMode2; n >= 0; n- - ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        abs level[ n ]
        AbsLevel[ xC ][ yC ] = abs level[ n ]
        if( abs level[ n ] > 0 )
            firstSigScanPosSb = n
        if( dep quant enabled flag )
            QState = QStateTransTable[ QState ][ abs level[ n ] & 1 ]
    }
    if( dep quant enabled flag | | !sign data hiding enabled flag )
        signHidden = 0
    else
        signHidden − ( lastSigScanPosSb − firstSigScanPosSb > 3 ? 1 : 0 )
    for( n = numSbCoeff − 1; n >= 0; n- - ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( sig coeff flag[ xC ][ yC ] &&
            ( !signHidden | | ( n != firstSigScanPosSb ) ) )
            coeff sign flag[ n ]
    }
    if( dep quant enabled flag ) {
        QState = startQStateSb
        for( n − numSbCoeff − 1; n >− 0; n- - ) {
            xC = ( xS << log2SbSize ) +
                DiagScanOrder[ log2SbSize ][ log2SbSize ][ n ][ 0 ]
``` | ae(v)<br><br><br><br><br>ae(v)<br><br><br><br><br><br><br><br><br><br><br><br><br><br><br><br><br><br><br><br><br><br><br><br><br><br>ae(v)<br><br><br><br><br><br><br><br><br><br><br><br><br><br><br><br><br><br><br><br><br><br><br><br><br><br><br><br><br><br><br><br><br><br>ae(v) |

TABLE 1-continued

Descriptor

```
                yC = ( yS << log2SbSize ) +
                        DiagScanOrder[ log2SbSize ][ log2SbSize ][ n ][ 1 ]
                if( sig coeff flag[ xC ][ yC ] )
                    TransCoeffLevel[ x0 ][ y0 ][ cIdx ][ xC ][ yC ] =
                            ( 2 * AbsLevel[ xC ][ yC ] - ( QState > 1 ? 1 : 0 ) ) *
                            ( 1 - 2 * coeff sign flag[ n ] )
                QState = QStateTransTable[ QState ][ par level flag[ n ] ]
    } else {
        sumAbsLevel = 0
        for( n - numSbCoeff - 1; n >- 0: n- - ) {
            xC = ( xS << log2SbSize ) +
                    DiagScanOrder[ log2SbSize ][ log2SbSize ][ n ][ 0 ]
            yC = ( yS << log2SbSize ) +
                    DiagScanOrder[ log2SbSize ][ log2SbSize ][ n ][ 1 ]
            if( sig coeff flag[ xC ][ yC ] ) {
                TransCoeffLevel[ x0 ][ y0 ][ cIdx ][ xC ][ yC ] =
                        AbsLevel[ xC ][ yC ] * ( 1 - 2 * coeff sign flag[ n ] )
                if( signHidden ) {
                    sumAbsLevel +- AbsLevel[ xC ][ yC ]
                    if( ( n = = firstSigScanPosSb ) && ( sumAbsLevel % 2 ) = = 1 ) )
                        TransCoeffLevel[ x0 ][ y0 ][ cIdx ][ xC ][ yC ] =
                                -TransCoeffLevel[ x0 ][ y0 ][ cIdx ][ xC ][ yC ]
                }
            }
        }
    }
}
if( cu_mts_flag[ x0 ][ y0 ] && ( cIdx = = 0 ) &&
    !transform_skip_flag[ x0 ][ y0 ][ cIdx ] &&
    ( ( CuPredMode[ x0 ][ y0 ] = = MODE_INTRA && numSigCoeff > 2 ) | |
        ( CuPredMode[ x0 ][ y0 ] = = MODE INTER ) )  ) {
    mts idx[ x0 ][ y0 ]                                                             ae(v)
}
``` transform_skip_flag indicates whether transform is skipped in an associated block. The transform_skip_flag may be a syntax element of a transform_skip_flag. The associated block may be a coding block (CB) or a transform block (TB). Regarding transform (and quantization) and residual coding procedures, CB and TB may be used interchangeably. For example, as described above, residual samples may be derived for CB, and (quantized) transform coefficients may be derived through transform and quantization for the residual samples, and through the residual coding procedure, information (e.g., syntax elements) efficiently indicating a position, magnitude, sign, etc. of the (quantized) transform coefficients may be generated and signaled. The quantized transform coefficients may simply be called transform coefficients. In general, when the CB is not larger than a maximum TB, a size of the CB may be the same as a size of the TB, and in this case, a target block to be transformed (and quantized) and residual coded may be called a CB or a TB. Meanwhile, when the CB is greater than the maximum TB, a target block to be transformed (and quantized) and residual coded may be called a TB. Hereinafter, it will be described that syntax elements related to residual coding are signaled in units of transform blocks (TBs) but this is an example and the TB may be used interchangeably with coding blocks (CBs as described above.

In an embodiment, the encoding apparatus may encode (x, y) position information of the last non-zero transform coefficient in a transform block based on the syntax elements last_sig_coeff_x_prefix, last_sig_coeff_y_prefix, last_sig_coeff_x_suffix, and last_sig_coeff_y_suffix. More specifically, the last_sig_coeff_x_prefix represents a prefix of a column position of a last significant coefficient in a scanning order within the transform block, the last_sig_coeff_y_prefix represents a prefix of a row position of the last significant coefficient in the scanning order within the transform block, the last_sig_coeff_x_suffix represents a suffix of a column position of the last significant coefficient in the scanning order within the transform block, and the last_sig_coeff_y_suffix represents a suffix of a row position of the last significant coefficient in the scanning order within the transform block. Here, the significant coefficient may represent a non-zero coefficient. In addition, the scanning order may be a right diagonal scanning order. Alternatively, the scanning order may be a horizontal scanning order or a vertical scanning order. The scanning order may be determined based on whether intra/inter prediction is applied to a target block (a CB or a CB including a TB) and/or a specific intra/inter prediction mode.

Thereafter, the encoding apparatus may divide the transform block into 4×4 sub-blocks, and then indicate whether there is a non-zero coefficient in the current sub-block using a 1-bit syntax element coded_sub_block_flag for each 4×4 sub-block.

If a value of coded_sub_block_flag is 0, there is no more information to be transmitted, and thus, the encoding apparatus may terminate the encoding process on the current sub-block. Conversely, if the value of coded_sub_block_flag is 1, the encoding apparatus may continuously perform the encoding process on sig_coeff_flag. Since the sub-block including the last non-zero coefficient does not require encoding for the coded_sub_block_flag and the sub-block including the DC information of the transform block has a high probability of including the non-zero coefficient, coded_sub_block_flag may not be coded and a value thereof may be assumed as 1.

If the value of coded_sub_block_flag is 1 and thus it is determined that a non-zero coefficient exists in the current sub-block, the encoding apparatus may encode sig_coeff_flag having a binary value according to a reverse scanning order. The encoding apparatus may encode the 1-bit syntax element sig_coeff_flag for each transform coefficient according to the scanning order. If the value of the transform coefficient at the current scan position is not 0, the value of sig_coeff_flag may be 1. Here, in the case of a subblock including the last non-zero coefficient, sig_coeff_flag does not need to be encoded for the last non-zero coefficient, so the coding process for the sub-block may be omitted. Level information coding may be performed only when sig_coeff_flag is 1, and four syntax elements may be used in the level information encoding process. More specifically, each sig_coeff_flag[xC][yC] may indicate whether a level (value) of a corresponding transform coefficient at each transform coefficient position (xC, yC) in the current TB is non-zero. In an embodiment, the sig_coeff_flag may correspond to an example of a syntax element of a significant coefficient flag indicating whether a quantized transform coefficient is a non-zero significant coefficient.

A level value remaining after encoding for sig_coeff_flag may be derived as shown in the following equation. That is, the syntax element remAbsLevel indicating a level value to be encoded may be derived from the following equation.

$$\text{remAbsLevel}=|\text{coeff}|-1 \quad \text{[Equation 1]}$$

Herein, coeff means an actual transform coefficient value.

Additionally, a least significant coefficient (LSB) value of remAbsLevel, which is indicated in the above-described Equation 1, may be encoded through par_level_flag, as shown below in Equation 2.

$$\text{par\_level\_flag}=\text{remAbsLevel} \,\&\, 1 \quad \text{[Equation 2]}$$

Herein, par_level_flag[n] may indicate a parity of a transform coefficient level (value) at a scanning position n.

A transform coefficient level value remAbsLevel that is to be encoded after performing par_level_flag encoding may be updated as shown below in the following equation.

$$\text{remAbsLevel}'=\text{remAbsLevel}>>1 \quad \text{[Equation 3]}$$

rem_abs_gt1_flag may indicate whether or not remAbsLevel' of the corresponding scanning position (n) is greater than 1, and rem_abs_gt2_flag may indicate whether or not remAbsLevel' of the corresponding scanning position (n) is greater than 2. Encoding for abs_remainder may be performed only in a case where rem_abs_gt2_flag is equal to 1.

A relationship between the actual transform coefficient value coeff and each syntax element may be as shown below in the following equation.

$$|\text{coeff}|=\text{sig\_coeff\_flag}+\text{par\_level\_flag}+2*(\text{rem\_abs\_gt1\_flag}+\text{rem\_abs\_gt2\_flag}+\text{abs\_remainder}) \quad \text{[Equation 4]}$$

Additionally, the following table indicates examples related to the above-described Equation 4.

TABLE 2

| \|coeff\| | sig_coeff_flag | par_level_flag | rem_abs_gt1_flag | rem_abs_gt2_flag | abs_remainder |
|---|---|---|---|---|---|
| 0 | 0 | | | | |
| 1 | 1 | 0 | 0 | | |
| 2 | 1 | 1 | 0 | | |
| 3 | 1 | 0 | 1 | 0 | |
| 4 | 1 | 1 | 1 | 0 | |
| 5 | 1 | 0 | 1 | 1 | 0 |
| 6 | 1 | 1 | 1 | 1 | 0 |
| 7 | 1 | 0 | 1 | 1 | 1 |
| 8 | 1 | 1 | 1 | 1 | 1 |
| 9 | 1 | 0 | 1 | 1 | 2 |
| 10 | 1 | 1 | 1 | 1 | 2 |
| 11 | 1 | 0 | 1 | 1 | 3 |
| ... | ... | ... | ... | ... | ... |

Herein, |coeff| indicates a transform coefficient level (value) and may also be indicates as an AbsLevel for a transform coefficient. Additionally, a sign of each coefficient may be encoded by using coeff_sign_flag, which is a 1-bit symbol.

Meanwhile, according to an embodiment, par_level_flag may indicate an example of a syntax element of a parity level flag for a parity of a transform coefficient level of the quantized transform coefficient. The rem_abs_gt1_flag may indicate an exemplary syntax element of a first transform coefficient level flag indicating whether or not the transform coefficient level is greater than a first threshold value, and the rem_abs_gt2_flag may indicate an exemplary syntax element of a second transform coefficient level flag indicating whether or not the transform coefficient level is greater than a second threshold value.

Additionally, the coeff_sign_flag may indicate a sign of a transform coefficient level at the corresponding scanning position (n). That is, the coeff_sign_flag may indicate a sign of a transform coefficient at the corresponding scanning position (n).

Additionally, the mts_idx may indicate transform kernels being applied along a horizontal direction and a vertical direction for residual samples within a current transform block.

Figure 5:
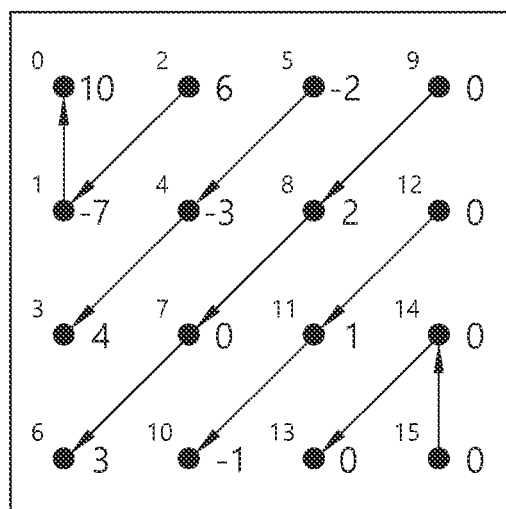
FIG. 5 is a diagram showing exemplary transform coefficients within a 4×4 block.

FIG. 5 is a diagram showing exemplary transform coefficients within a 4×4 block.

The 4×4 block of FIG. 5 shows an example of quantized coefficients. The block shown in FIG. 5 may be a 4×4 transform block or a 4×4 subblock of an 8×8, 16×16, 32×32, 64×64 block. The 4×4 block of FIG. 5 may indicate a luma block or chroma block.

For example, encoding results for coefficients being anti-diagonally scanned in FIG. 5 may be as shown below in the following table.

TABLE 3

| | scan_pos | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| coefficients | 0 | 0 | 0 | 0 | 1 | −1 | 0 | 2 | 0 | 3 | −2 | −3 | 4 | 6 | −7 | 10 |
| sig_coeff_flag | 0 | 0 | 0 | 0 | 1 | 1 | 0 | 1 | 0 | 1 | 1 | 1 | 1 | 1 | 1 | 1 |
| par_level_flag | | | | | 0 | 0 | | 1 | | 0 | 1 | 0 | 1 | 1 | 0 | 1 |
| rem_abs_qt1_flag | | | | | 0 | 0 | | 0 | | 1 | 0 | 1 | 1 | 1 | 1 | 1 |
| rem_abs_qt2_flag | | | | | | | | | | 0 | | | 0 | 0 | 1 | 1 |
| abs_remainder | | | | | | | | | | | | | | 0 | 1 | 2 |
| ceoff_sign_flag | | | | | 0 | 1 | | 0 | | 0 | 1 | 1 | 0 | 0 | 1 | 0 |

In Table 3, which is presented above, scan_pos indicates positions of coefficients according to anti-diagonal scanning. scan_pos 15 may be a transform coefficient that is the first to be scanned in the 4×4 block, i.e., a transform coefficient located at a bottom right corner. And, scan_pos 0 may be a transform coefficient that is the last to be scanned in the 4×4 block, i.e., a transform coefficient located at a top left corner. Meanwhile, according to the embodiment, the scan_pos may be referred to as a Scan Position. For example, the scan_pos 0 may be referred to as Scan Position 0.

Meanwhile, as described above, in case an input signal is a syntax element that is not a binarized value (or binary value), an encoding apparatus may transform the input signal to a binarized value, by performing binarization on a value of the input signal. Additionally, a decoding apparatus may derive a binarized value (i.e., binarized bin) of the syntax element by decoding the syntax element, and the decoding apparatus may derive a value of the syntax element by performing inverse binarization on the binarized value. The binarization process may be performed as a Truncated Rice (TR) binarization process, a k-th order Exp-Golomb (EGk) binarization process, or a Fixed-length (FL) binarization process, and so on, which will be described later on. Additionally, the inverse binarization process may be performed based on the TR binarization process, the EGk binarization process, or the FL binarization process and may be indicated as a process of deriving a value of the syntax element.

For example, the TR binarization process may be performed as described below.

An input of the TR binarization process may be a request for a TR binarization and a c Max and cRiceParam for the syntax element. Additionally, an output of the TR binarization process may be a TR binarization for a symbolVal, which is a value corresponding to a bin string.

More specifically, for example, in case a suffix bin string for a syntax element exists, a TR bin string for the syntax element may be a concatenation of a prefix bin string and a suffix bin string. And, in case the suffix bin string does not exist, the TR bin string for the syntax element may be the prefix bin string. For example, the prefix bin string may be derived as described below.

A prefix value of the symbolVal for the syntax element may be derived as shown below in the following equation.

$$\text{prefixVal} = \text{symbolVal} \gg c\text{RiceParam} \quad \text{[Equation 5]}$$

Herein, a prefixVal may indicate a prefix value of the symbolVal. A prefix of the TR bin string (i.e., prefix bin string) of the syntax element may be derived as described later on.

For example, in case the prefixVal is less than c Max>>cRiceParam, a prefix bin string may be a bit string of length prefixVal+1 being indexed by a binIdx. That is, in case the prefixVal is less than c Max>>cRiceParam, the prefix bin string may be a bit string having prefixVal+1 number of bits indicated by a binIdx. A bin for the binIdx being less than a prefixVal may be equal to 1. Additionally, a bin for a binIdx that is the same as a prefixVal may be equal to 0.

For example, a bin string that is derived by unary binarization for the prefixVal may be as shown below in the following table.

TABLE 4

| prefixVal | Bin string | | | | | |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| . . . | | | | | | |
| binIdx | 0 | 1 | 2 | 3 | 4 | 5 |

Meanwhile, in case the prefixVal is not less than c Max>>cRiceParam, the prefix bin string may be a bin string having a length of c Max>>cRiceParam and all bins being equal to 1.

Additionally, in case the c Max is greater than symbolVal, and in case cRiceParam is greater than 0, a prefix bin string of a TR bin string may exist. For example, the prefix bin string may be derived as described below.

A suffix value of the symbolVal for the syntax element may be derived as shown below in the following equation.

$$\text{suffixVal} = \text{symbolVal} - ((\text{prefixVal}) \ll c\text{RiceParam}) \quad \text{[Equation 6]}$$

Herein, a suffixVal may indicate a suffix value of the symbolVal.

A suffix of the TR bin string (i.e., suffix bin string) may be derived based on an FL binarization process for a suffixVal having a c Max value of $(1 \ll c\text{RiceParam}) - 1$.

Meanwhile, if the value of a cRiceParam, which is an input parameter, is equal to 0, the TR binarization may exactly be a truncated unary binarization, and the TR binarization may use a c Max value that is the same as a maximum value possible of a syntax element that is always being decoded.

Additionally, for example, the EGk binarization process may be performed as described below. A syntax element that is coded by a ue(v) may be an Exp-Golomb coded syntax element.

For example, a 0-th order Exp-Golomb (EG0) binarization process may be performed as described below.

A parsing process for the syntax element may start by counting a number of leading bits, such as 0, by reading bits including a first non-zero bit starting from a current position of a bitstream. The process may be indicated as shown in the following table.

TABLE 5

```
leadingZeroBits = −1
for( b = 0; !b; leadingZeroBits++ )
    b = read_bits( 1 )
```

Additionally, a variable codeNum may be derived as shown below in the following equation.

$$codeNum = 2^{leadingZeroBits} - 1 + \text{read\_bits}(leadingZeroBits) \quad \text{[Equation 7]}$$

Herein, a value returned from read_bits(leadingZeroBits), i.e., a value indicated by read_bits (leadingZeroBits), may be interpreted as a binary representation of an unsigned integer for a most significant bit that is recorded first.

A structure of an Exp-Golomb code, which is separated into a "prefix" bit and a "suffix" bit may be indicated as shown below in the following equation.

TABLE 6

| Bit string form | Range of codeNum |
|---|---|
| 1 | 0 |
| 0 1 $x_0$ | 1 ... 2 |
| 0 0 1 $x_1$ $x_0$ | 3 ... 6 |
| 0 0 0 1 $x_2$ $x_1$ $x_0$ | 7 ... 14 |
| 0 0 0 0 1 $x_3$ $x_2$ $x_1$ $x_0$ | 15 ... 30 |
| 0 0 0 0 0 1 $x_4$ $x_3$ $x_2$ $x_1$ $x_0$ | 31 ... 62 |
| ... | ... |

A "prefix" bit may be a bit that is parsed as described above for leadingZeroBits calculation and may be indicated as 0 or 1 of the bit string in the above-mentioned Table 6. That is, a bit string that is initiated by 0 or 1 in the above-mentioned Table 6 may represent a prefix bit string. A "suffix" bit string may be a bit that is parsed from a calculation of a codeNum and may be indicated as xi in the above-mentioned Table 6. That is, a bit string that is initiated by xi of the above-mentioned Table 6 may represent a suffix bit string. Herein, i may be a value within a range from 0 to LeadingZeroBits−1. Additionally, each xi may be equal to 0 or 1.

A bit string being allocated to the codeNum may be same as the following table.

TABLE 7

| Bit string | codeNum |
|---|---|
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| ... | ... |

In case a descriptor of a syntax element is ue(v), i.e., in case a syntax element is coded by a ue(v), a value of the syntax element may be the same as the codeNum.

Additionally, for example, the EGk binarization process may be performed as described below.

An input of the EGk binarization process may be a request for an EGk binarization. Additionally, an output of the EGk binarization process may be an EGk binarization for a symbolVal, which is a value corresponding to a bin string.

A bit string of an EGk binarization process for a symbolVal may be derived as shown below.

TABLE 8

```
absV = Abs( symbolVal )
stopLoop = 0
do
    if( absV >= ( 1 << k ) ) {
        put( 1 )
        absV = absV − ( 1 << k )
        k++
    } else {
        put( 0 )
        while( k− − )
            put( ( absV >> k ) & 1 )
        stopLoop = 1
    }
while( ! stopLoop )
```

Referring to the above-mentioned Table 8, a binarized value X may be added at an end of a bit string through each call of put(X). Herein, X may be equal to 0 or 1.

Additionally, for example, the FL binarization process may be performed as described below.

An input of the FL binarization process may be a request for an FL binarization and a c Max for the syntax element. Additionally, an output of the FL binarization process may be an FL binarization for a symbolVal, which is a value corresponding to a bin string.

FL binarization may be configured by using a bit string having a number of bits, which is a fixed length of a symbol value symbolVal. Herein, the fixed length bit may be an unsigned integer bit string. That is, a bit string for a symbol value symbolVal may be derived through FL binarization, and a bit length (i.e., number of bits) of the bit string may be a fixed length.

For example, the fixed length may be derived as shown below in the following equation.

$$\text{fixedLength} = \text{Ceil}(\text{Log 2}(c\text{ Max}+1)) \quad \text{[Equation 8]}$$

Indexing of bins for FL binarization may be a method using values increasing in an order from a most significant bit to a least significant bit. For example, a bin index related to the most significant bit may be binIdx=0.

Meanwhile, for example, a binarization process for a syntax element abs_remainder, among the residual information, may be performed as described below.

An input of the binarization process for abs_remainder may be a request for binarization of a syntax element abs_remainder[n], a color component cIdx, a luma position (x0, y0), a current coefficient scan position (xC, yC), a binary logarithm of a transform block width log 2TbWidth, and a binary logarithm of a transform block height log 2TbHeight. The luma position (x0, y0) may indicate a top-left sample of a current luma transform block that is based on a top-left luma sample of a picture.

An output of the binarization process for abs_remainder may be a binarization of the abs_remainder (i.e., a binarized bin string of the abs_remainder). Available bin strings for the abs_remainder may be derived through the binarization process.

A rice parameter cRiceParam for the abs_remainder may be derived through a rice parameter derivation process, which is performed by inputting the color component cIdx and luma position (x0, y0), current coefficient scan position (xC, yC), and binary logarithm of a transform block height log 2TbHeight. The rice parameter derivation process will be described later on in more detail.

Additionally, for example, a c Max for the abs_remainder may be derived based on the rice parameter cRiceParam. The c Max may be derived as shown below in the following equation.

$$c\ Max = (cRiceParam == 1\ ?\ 6 : 7) << cRiceParam \qquad [\text{Equation 9}]$$

Referring to the aforementioned Equation 9, if a value of the cRiceParam is equal to 1, the c Max may be derived as 6<<cRiceParam, and, if a value of the cRiceParam is not equal to 1, the c Max may be derived as 7<<cRiceParam.

Meanwhile, in a case where a suffix bin string exists, the binarization for the abs_remainder, i.e., a bin string for the abs_remainder may be a concatenation of prefix bin string and a suffix bin string. Additionally, in a case where the suffix bin string does not exist, the bin string for the abs_remainder may be the prefix bin string.

For example, the prefix bin string may be derived as described below.

A prefix value prefixVal of the abs_remainder may be derived as shown below in the following equation.

$$prefixVal = Min(c\ Max, abs\_remainder[n]) \qquad [\text{Equation 10}]$$

A prefix of the bin string (i.e., prefix bin string) of the abs_remainder may be derived through a TR binarization process for the prefixVal, which uses the c Max and the cRiceParam as input.

If the prefix bin string is the same as a bit string having all bits being equal to 1 and having a bit length of 4, a prefix bin string of the bin string of the abs_remainder may exist, and the prefix bin string may be derived as shown below.

A suffix value suffixVal of the abs_remainder may be derived as shown below in the following equation.

$$suffixVal = abs\_remainder[n] - c\ Max \qquad [\text{Equation 11}]$$

A suffix of the bin string (i.e., suffix bin string) of the abs_remainder may be derived through an EGk binarization process for the suffixVal, which configures k as cRiceParam+1.

Meanwhile, the above-described rice parameter derivation process may be as described below.

An input of the rice parameter derivation process may indicate a color component cIdx, a luma position (x0, y0), a current coefficient scan position (xC, yC), a binary logarithm of a transform block width log 2TbWidth, and a binary logarithm of a transform block height log 2TbHeight. The luma position (x0, y0) may indicate a top-left sample of a current luma transform block that is based on a top-left luma sample of a picture. Additionally, an output of the rice parameter derivation process may be the rice parameter cRiceParam.

For example, based on an array AbsLevel[x][C] for the transform block having the given syntax element sig_coeff_flag[x][y] and the component index cIdx, and the top-left luma position (x0, y0), the variable locSumAbs may be derived as specified by a pseudo code, which is disclosed in the following table.

TABLE 9

```
locSumAbs = 0
if( xC < (1 << log2TbWidth) - 1 ) {
    locSumAbs += AbsLevel[ xC + 1 ][ yC ] -
      sig_coeff_flag[ xC + 1 ][ yC ]
    if( xC < (1 << log2TbWidth) - 2 )
      locSumAbs += AbsLevel[ xC + 2 ][ yC ] -
        sig_coeff_flag[ xC + 2 ][ yC ]
    if( yC < (1 << log2TbHeight) - 1 )
      locSumAbs += AbsLevel[ xC + 1 ][ yC + 1 ] -
        sig_coeff_flag[ xC + 1 ][ yC + 1 ]
}
```

TABLE 9-continued

```
if( yC < (1 << log2TbHeight) - 1 ) {
    locSumAbs += AbsLevel[ xC ][ yC + 1 ] -
      sig_coeff_flag[ xC ][ yC + 1 ]
    if( yC < (1 << log2TbHeight) - 2 )
      locSumAbsPass1 += AbsLevelPass1 [ xC ][ yC + 2 ] -
        sig_coeff_flag[ xC ][ yC + 2 ]
}
```

The rice parameter cRiceParam may be derived as described below.

For example, in case the locSumAbs is less than 12, the cRiceParam may be set to 0. Alternatively, in case the locSumAbs is less than 25, without corresponding to the above-described conditions (i.e., in case the locSumAbs is equal to or greater than 12 and less than 25), the cRiceParam may be set to 1. Alternatively, in case the locSumAbs does not correspond to the above-described conditions (i.e., in case the locSumAbs is equal to or greater than 25), the cRiceParam may be set to 2.

Meanwhile, in the VVC standard, a transform for a large block size, e.g., a block having a maximum (or largest) size of 64×64 is available. And, therefore, this may be useful for coding a high-resolution image of 1080p and 4k sequences. However, despite the transform block size, small residual may exist for a large block partition, and residual energy may be concentrated to low-frequency variables within a transform domain.

Accordingly, for example, proposed herein is a solution where high-frequency transform coefficients for a large-sized block (e.g., a transform block with a width and/or height of 64) are equal to 0, and where only low-frequency coefficients are maintained. The above-described solution may be represented as high frequency zeroing. That is, the high frequency zeroing means a process of zeroing (i.e., determining as 0) transform coefficients that are related to a high frequency of a predetermined value or higher within a (transform) block having a first width W1 and a first height H1.

For example, for a transform block having a size of W×H, if the value of W is equal to 64, transform coefficients of left-side 32 columns within the transform block may be maintained, and the remaining transform coefficients may be zeroed. Additionally, for a transform block having a size of W×H, if the value of H is equal to 64, only the transform coefficients of top-side 32 columns may be maintained, and the remaining transform coefficients may be zeroed. That is, for a transform block having the size of W×H, top-left positions of the block may be included, and transform coefficients within a region having a size of (W==64?32: W)×(H==64?32:H) may be maintained, and the remaining transform coefficients may be set to 0 without being calculated. Alternatively, although the remaining transform coefficients are calculated, the corresponding transform coefficients may be disregarded (or ignored) (or processed as 0). Meanwhile, in case a Transform Skip mode is applied to a large-sized block, the high-frequency zeroing may not be applied, and all of the coefficient values of the large-sized block may be used.

The above-described high-frequency zeroing may be performed during a transform and/or quantization process, or may also be performed during a residual coding process.

For example, in case the high-frequency zeroing is performed during a transform and/or quantization process, during the transform process of residual samples, remaining transform coefficients excluding the top-left transform coefficients (or lower-frequency coefficients) may be set to 0.

Alternatively, during a quantization process after the transform process, the remaining transform coefficients may be set to 0. As another example, in case the high-frequency zeroing is performed during a residual coding process, although the remaining transform coefficients, which are derived by the transform/quantization result(s), may exist as non-zero significant coefficients, the values of the remaining transform coefficients may be processed to be regarded as 0 (i.e., the remaining transform coefficients may be regarded not to exist as non-zero significant coefficients).

Figure 6:
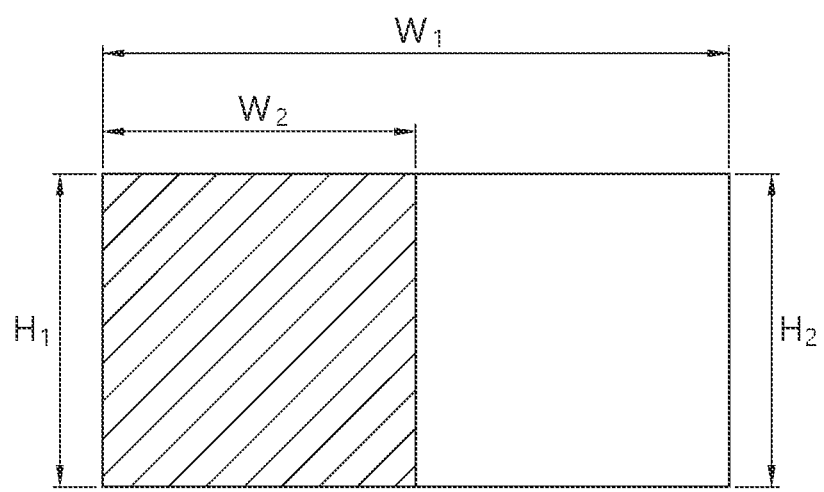
FIG. 6 is a diagram for describing high frequency zeroing according to an embodiment of the present specification.

FIG. 6 is a diagram for describing high frequency zeroing according to an embodiment of the present specification.

In the present specification, the term "high-frequency zeroing" refers to a process of zeroing (i.e., determining as 0) transform coefficients that are related to a high frequency of a predetermined value or higher within a (transform) block having a first horizontal size (or length) W1 and a first vertical size (or length) H1. In case high-frequency zeroing is being applied, among the transform coefficients within the (transform) block, transform coefficient values of transform coefficients located outside of a low-frequency transform coefficient region, which is configured based on a second horizontal size W2 and a second vertical size H2, may all be determined as (or set to) 0. The outside of the low-frequency transform coefficient region may be referred to as a high-frequency transform coefficient region. In an example, the low-frequency transform coefficient region may be a rectangular region being located from a top-left side of the (transform) block.

In the present specification, specific terms or sentences are used in order to define specific information or concepts. For example, as described above, in the present specification, a process of zeroing (i.e., determining as 0) transform coefficients that are related to a high frequency of a predetermined value or higher within a (transform) block having a first horizontal size (or length) W1 and a first vertical size (or length) H1 is defined as "high-frequency zeroing", and a region having zeroing processed therein through high-frequency zeroing is defined as a "high-frequency coefficient region", and a region not having the zeroing processed therein is defined as a "low-frequency coefficient region". In order to express a size of the low-frequency coefficient region, a second horizontal size (or length) W2 and a second vertical size (or length) H2 are used.

However, "high-frequency zeroing" may be replaced by other various terms, such as highfrequency zeroing, high frequency zeroing, high-frequency zero-out, zero-out, and so on. The term "high-frequency coefficient region" may be replaced by other various terms, such as high-frequency zeroing application region, high-frequency zeroing region, high-frequency region, high-frequency coefficient region, high-frequency zero-out region, zero-out region, and so on, and the term "low-frequency coefficient region" may be replaced by other various terms, such as high-frequency zeroing non-application region, low-frequency region, low-frequency coefficient region, limited region, and so on. However, when interpreting the overall content of the present specification, the interpretation of the specific terms or sentences used in the present specification for defining specific information or concepts shall not be limited only to the term itself. Instead, such terms shall be interpreted based on various operations, functions, and effects according to the content and underlying meaning of the corresponding terms.

According to an embodiment, a method of performing binarization on syntax elements last_sig_coeff_x_prefix and last_sig_coeff_y_prefix for a (transform) block (TB, TU or CB), to which high-frequency zeroing is applied, may be proposed. The last_sig_coeff_x_prefix and last_sig_coeff_y_ prefix may be binarized by using the above-described truncated Rice code. And, in this case, 0 may be used as the value of the cRiceParam. The value of c Max, which is used for the binarization of the truncated Rice code, may be determined based on Equation 1, when performing binarization of the last_sig_coeff_x_prefix. And, the value of c Max may be determined based on Equation 2, when performing binarization of the last_sig_coeff_y_prefix.

$$c\,\text{Max} = (\log_2 W_1 << 1) - 1 \quad \text{[Equation 12]}$$

$$c\,\text{Max} = (\log_2 H_1 << 1) - 1 \quad \text{[Equation 13]}$$

Herein, W1 may represent a horizontal length (or width) of a (transform) block, and H1 may represent a vertical length (or height) of the (transform) block. For example, in case of a 64×32 transform block, as shown in FIG. 6, W1 is equal to 64, and H1 is equal to 32. Accordingly, the c Max value for the binarization of the last_sig_coeff_x_prefix may be equal to 11, and the c Max value for the binarization of the last_sig_coeff_y_prefix may be equal to 9.

The following Table 10 shows binarization of a case where W1 or H1 is equal to 32, and the following Table 2 shows binarization codewords of a case where W1 or H1 is equal to 64. According to an embodiment, since truncated Rice code binarization may be performed based on the size of a transform block, as shown below in Table 11, a codeword of the last_sig_coeff_x_prefix or last_sig_coeff_y_prefix for encoding a case where the value of a LastSignificantCoeffX or LastSignificantCoeffY is within a range of 32 to 47 may be '11111111110', and the codeword for encoding a case where the value of a LastSignificantCoeffX or LastSignificantCoeffY is within a range of 48 to 63 may be '11111111111'. The binarization may be performed on both cases based on 11 bins. Herein, the codeword may also be referred to as a bin string.

TABLE 10

| LastSignificantCoeffX or LastSignificantCoeffY | codeword | length of the codeword |
|---|---|---|
| 0 | 0 | 1 |
| 1 | 10 | 2 |
| 2 | 110 | 3 |
| 3 | 1110 | 4 |
| 4, 5 | 11110 | 5 |
| 6, 7 | 111110 | 6 |
| 8~11 | 1111110 | 7 |
| 12~15 | 11111110 | 8 |
| 16~23 | 111111110 | 9 |
| 24~31 | 111111111 | 9 |

TABLE 11

| LastSignificantCoeffX or LastSignificantCoeffY | codeword | length of the codeword |
|---|---|---|
| 0 | 0 | 1 |
| 1 | 10 | 2 |
| 2 | 110 | 3 |
| 3 | 1110 | 4 |
| 4, 5 | 11110 | 5 |
| 6, 7 | 111110 | 6 |
| 8~11 | 1111110 | 7 |
| 12~15 | 11111110 | 8 |
| 16~23 | 111111110 | 9 |
| 24~31 | 1111111110 | 10 |

TABLE 11-continued

| LastSignificantCoeffX or LastSignificantCoeffY | codeword | length of the codeword |
|---|---|---|
| 32~47 | 11111111110 | 11 |
| 48~63 | 11111111111 | 11 |

Meanwhile, as described above, an encoding apparatus (entropy encoder) may perform a residual coding procedure for (quantized) transform coefficients. The encoding apparatus may perform residual coding on the (quantized) transform coefficients within a current block (current coding block (CB) or current transform block (TB)) according to a scanning order. At this point, the encoding apparatus may generate and encode various syntax elements related to residual information as shown in Table 1, which is presented above.

As shown in the above-mentioned Table 1, in case the value of last_sig_coeff_x_prefix is greater than 3, the last_sig_coeff_x_suffix may be further signaled, and a LastSignificantCoeffX may be derived based on the value of the last_sig_coeff_x_suffix. For example, a codeword of the last_sig_coeff_x_prefix for encoding a case where the value of LastSignificantCoeffX is within the range of 32~47 may be '11111111110'. And, which value within the range of 32~47 is to be used may be determined based on the value of the last_sig_coeff_x_suffix. Additionally, as shown in Table 1, in case the value of last_sig_coeff_y_prefix is greater than 3, the last_sig_coeff_y_prefix may be further signaled, and a LastSignificantCoeffY may be derived based on the value of last_sig_coeff_y_suffix. For example, a codeword of the last_sig_coeff_x_prefix for encoding a case where the value of LastSignificantCoeffY is within the range of 32~47 may be '11111111110'. And, which value within the range of 32~47 is to be used may be determined based on the value of the last_sig_coeff_y_suffix.

Detailed calculation for deriving the LastSignificantCoeffX or LastSignificantCoeffY may, for example, be performed as shown below in Table 12.

TABLE 12

The column position of the last significant coefficient in scanning order within a transform block LastSignificantCoeffX is derived as follows:
   If last_sig_coeff_x_suffix is not present, the following applies:
LastSignificantCoeffX = last_sig_coeff_x_prefix
   Otherwise (last_sig_coeff_x_suffix is present), the following applies:
LastSignificantCoeffX= (1<<((last_sig_coeff_x_prefix>>1)−1)) * (2+(last_sig_coeff_x_prefix&1)) + last_sig_coeff_x_suffix
The row position of the last significant coefficient in scanning order within a transform block LastSignificantCoeffY is derived as follows:
   If last_sig_coeff_y_suffix is not present, the following applies:
LastSignificantCoeffY = last_sigcoeff_y_prefix
   Otherwise (last_sig_coeff_y_suffix is present), the following applies:
LastSignificantCoeffY=(1<<((last_sig_coeff_y_prefix>>1)−1))*(2+(last_sig_coeff_y_prefix&1))+last_sig_coeff_y_suffix High-frequency zeroing means zeroing (i.e., determining as 0) transform coefficients that are related to a high frequency of a predetermined value or higher within a (transform) block having a first horizontal size (W1) and a first vertical size (H1), thereby limiting residual transform coefficients to a second horizontal size (W2) and a second vertical size (H2). At this point, according to an embodiment, instead of a method of performing binarization based on a truncated Rice code that is based on the size (first horizontal size or first vertical size) of a transform block, a method of performing binarization based on a truncated Rice code that is based on the size (second horizontal size or second vertical size) of a limited region, which is derived through high-frequency zeroing, may be considered. After defining a c Max for the last_sig_coeff_x_prefix and a c Max for the last_sig_coeff_y_prefix by using the following Equation 14 and Equation 15, respectively, a truncated Rice code may be generated.

$$c\,\text{Max}=(\log 2(\min(W1,W2))<<1)-1 \quad \text{[Equation 14]}$$

$$c\,\text{Max}=(\log 2(\min(H1,H2))<<1)-1 \quad \text{[Equation 15]}$$

According to an embodiment, when the first horizontal size or first vertical size is equal to 64, and when the second horizontal size or second vertical size is equal to 32, the truncated Rice code being derived based on Equation 14 or Equation 15 may be as shown below in Table 13.

TABLE 13

| LastSignificantCoeffX or LastSignificantCoeffY | codeword | length of the codeword |
|---|---|---|
| 0 | 0 | 1 |
| 1 | 10 | 2 |
| 2 | 110 | 3 |
| 3 | 1110 | 4 |
| 4, 5 | 11110 | 5 |
| 6, 7 | 111110 | 6 |
| 8~11 | 1111110 | 7 |
| 12~15 | 11111110 | 8 |
| 16~23 | 111111110 | 9 |
| 24~31 | 111111111 | 9 |
| 32~47 | N/A | N/A |
| 48~63 | N/A | N/A |

Through high frequency zeroing, since residual transform coefficients are disappeared (or removed) from the high-frequency coefficients in a high-frequency transform coefficient region, which is formed outside of the second horizontal size or second vertical size, it may be possible to design a binarization codeword, as shown below in Table 6.

According to the embodiment, W2 and H2 may be set to a fixed value. Alternatively, W2 and H2 may be determined based on W1 and H1. Alternatively, information indicating W2 and H2 may be signaled from the encoding apparatus to the decoding apparatus. According to the embodiment, the W2 and H2 may each be set to 32 or 16. In another example, the W2 and H2 may be derived as ½ of W1 and ½ of H1, respectively. In yet another example, the W2 and H2 may be derived as ½ of max(W1,H1). However, this is merely an example, and the W2 and H2 may also be determined by other various methods configured by the encoding apparatus and the decoding apparatus. By performing the proposed method, codeword lengths for some values of the LastSignificantCoeffX or LastSignificantCoeffY may be effectively reduced. Additionally, since the coded bin being reduced through this is a context-coded bin, there may be advantages in the aspect of throughput.

Based on the embodiments described in FIG. 6, a residual coding method, which will be described later on in FIG. 9a to FIG. 10b. Additionally, in another example, based on the embodiments described in FIG. 6, an encoding method, which will be described later on in FIG. 11, or a decoding method, which will be described later on in FIG. 13, may be performed.

Meanwhile, another embodiment of high-frequency zeroing that may be performed in addition to, or as an alternative of the embodiment of the high-frequency zeroing, which is described in FIG. 6, may be proposed.

Figure 7:
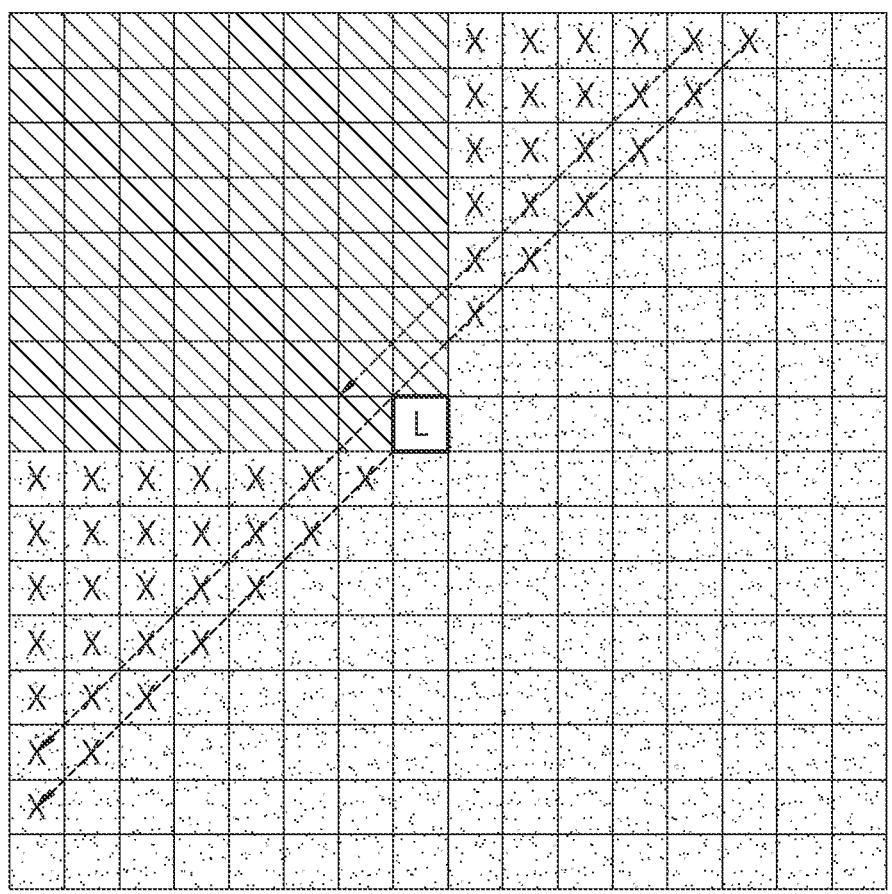
FIG. 7 is a diagram for describing an exemplary method for scanning transform coefficients for a current block having high frequency zeroing applied thereto.

FIG. 7 is a diagram for describing an exemplary method for scanning transform coefficients for a current block having high frequency zeroing applied thereto.

According to an embodiment, residual coding may be performed by scanning transform coefficient groups along an anti-diagonal direction starting from a last transform coefficient group including a last non-zero coefficient. Conversely, additionally or alternatively, according to another embodiment, a scanning order of transform coefficient groups for a transform block having high-frequency zeroing applied thereto may be changed.

FIG. 7 shows a method in which a 4×4 transform coefficient group is being scanned in a 64×64 transform block having high-frequency zeroing applied thereto. In FIG. 5, the part being marked as L means a 4×4 transform coefficient group including a last non-zero coefficient. High-frequency zeroing means a process of zeroing (or zeroing-out) transform coefficients that are related to a high frequency of a predetermined value or higher within a transform block having a first horizontal size (W1) and/or a first vertical size (H1), thereby limiting residual transform coefficients to a second horizontal size (W2) and/or a second vertical size (H2). And, in FIG. 7, the dotted 4×4 blocks represent a region being zeroed-out through high-frequency zeroing. Also, in FIG. 7, the slanted-line region may be referred to as a low-frequency transform coefficient region, and the dotted region may be referred to as a high-frequency transform coefficient region.

W2 and/or H2 may be set as a fixed value or may be determined based on W1 and/or H1. Alternatively, the information indicating W2 and/or H2 may be signaled from the encoding apparatus to the decoding apparatus. According to an embodiment, the W2 and H2 may each be set to 32 or 16. According to another embodiment, the W2 and H2 may be derived as ½ of W1 and ½ of H1, respectively. In yet another example, the W2 and H2 may be derived as ½ of max(W1,H1). However, the above-mentioned examples are merely some examples, and, therefore, the W2 and H2 may also be determined by other various methods configured by the encoding apparatus and the decoding apparatus.

When using a transform coefficient group scanning method according to FIG. 7, it may be verified that a region being zeroed-out through high-frequency zeroing shall also be scanned in accordance with an anti-diagonal scanning order. As described above, in case of scanning unnecessary blocks, coding complexity may be increased, and there may occur a burden of having to encode a coded subblock flag (a flag indicating whether or not all transform coefficient levels of transform coefficients for subblocks within the current block are equal to 0, and, herein, for example, the flag may be expressed as coded_sub_block_flag) each time as 0 in a zero-out region (a region configured of 4×4 blocks each being marked as x in FIG. 7).

Therefore, in case the high-frequency zeroing is being applied, a method of limiting the scanning of transform coefficient groups to be performed only within a size (second horizontal size or second vertical size) of a region being limited in high-frequency zeroing (or a low-frequency transform coefficient region) may be considered. According to an embodiment, instead of the method for performing transform coefficient group scanning according to FIG. 7, a method for performing transform coefficient group scanning, as shown in FIG. 8, will be proposed.

Figure 8:
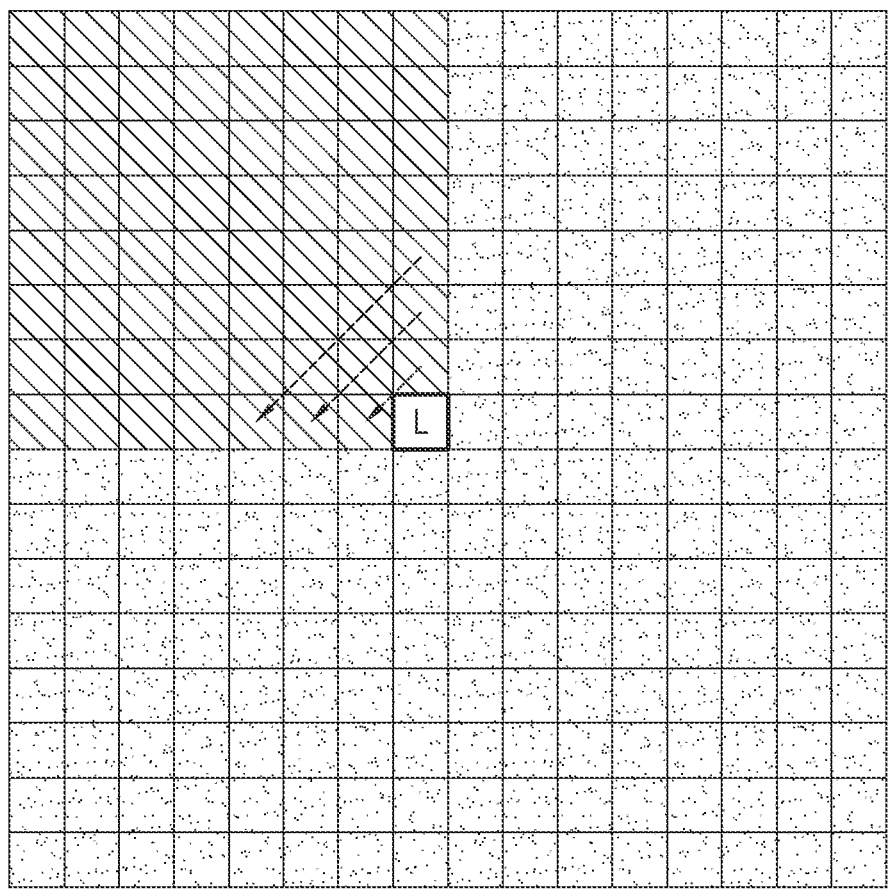
FIG. 8 is a diagram for describing another exemplary method for scanning transform coefficients for a current block having high frequency zeroing applied thereto.

FIG. 8 is a diagram for describing another exemplary method for scanning transform coefficients for a current block having high frequency zeroing applied thereto.

In case of performing a transform coefficient group scanning method according to FIG. 8, unnecessary scanning processes may be omitted (or skipped), and unnecessary encoding of coded subblock flag may be prevented. That is, according to the embodiment of FIG. 8, the encoding apparatus may not include a coded subblock flag for a subblock being located in a region exceeding W2 and/or H2 (i.e., high-frequency transform coefficient region) within the current (transform) block in a residual coding syntax (or bitstream). That is, a bit related to a syntax element coded_sub_block_flag for a subblock being located in a region exceeding W2 and/or H2. In this case, the decoding apparatus may infer that a last significant coefficient is not located in a region exceeding W2 and/or H2 without performing a scanning process on a subblock being located in the region exceeding W2 and/or H2. Additionally, the decoding apparatus may infer that the value of a syntax element coded_sub_block_flag is equal to 0, without parsing the corresponding syntax element coded_sub_block_flag for a subblock being located in a region exceeding W2 and/or H2.

Therefore, in the embodiment according to FIG. 8, when compared to the embodiment according to FIG. 7, 'coded_sub_block_flag=0' may not be coded for the total of 494×4 subblocks being included in the 64×64 current block. Since the coded_sub_block_flag is coded as a context-coded bin, according to the embodiment of FIG. 8, there may be advantages in the aspect of throughput. That is, in case it is regarded that a non-zero coefficient does not exist in a zero-out region when high frequency zeroing is applied during a residual coding process, computational complexity that is required during a transform process may be reduced in view of the memory.

For example, based on the embodiments described in FIG. 7 and FIG. 8, a residual coding method, which will be described later on in FIG. 9a to FIG. 10b. Additionally, in another example, based on the embodiments described in FIG. 7 and FIG. 8, an encoding method, which will be described later on in FIG. 11, or a decoding method, which will be described later on in FIG. 13, may be performed.

Figure 9A:
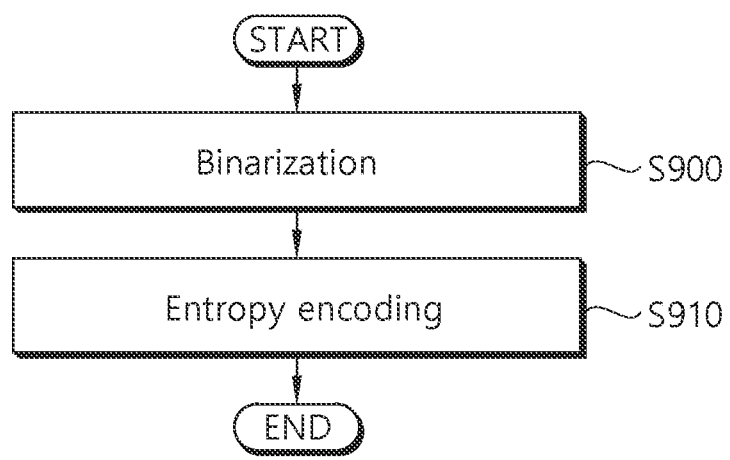
FIG. 9a and FIG. 9b are diagrams for describing configuration and operation of an entropy encoder according to an embodiment of the present specification.
Figure 9B:
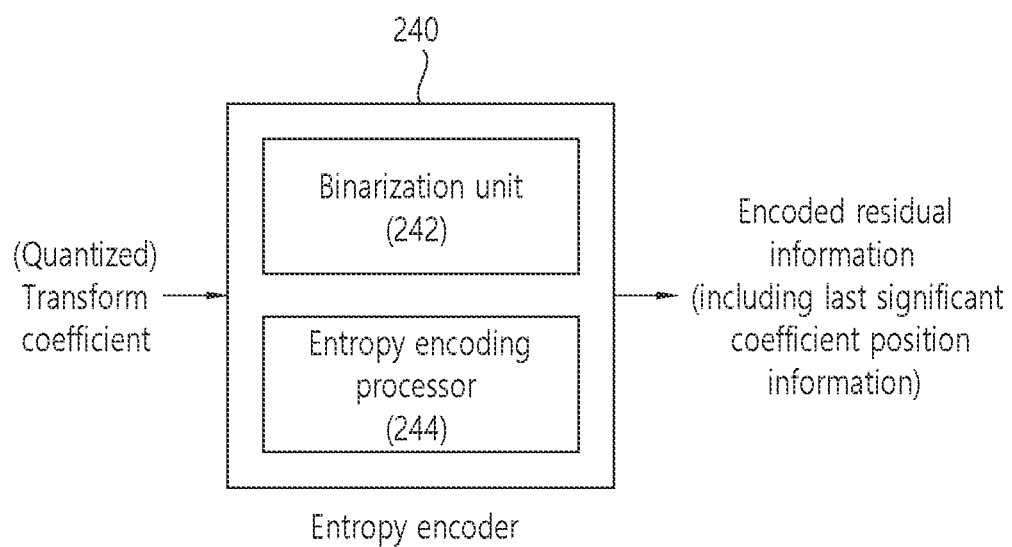

FIG. 9a and FIG. 9b are diagrams for describing configuration and operation of an entropy encoder according to an embodiment of the present specification.

Referring to FIG. 9a and FIG. 9b, an encoding apparatus (entropy encoder) may perform a residual coding process for (quantized) transform coefficients. According to an embodiment, the (quantized) transform coefficients may be transform coefficients having high-frequency zeroing applied thereto, and, according to another embodiment, the (quantized) transform coefficients may include non-zero high-frequency coefficients. And, at this point, during the residual coding procedure being performed in the entropy encoder, the high-frequency coefficients may be regarded or treated as 0. The encoding apparatus may perform residual coding on the (quantized) transform coefficients within the current block (current coding block (CB) or current transform block (FB)), as described above in FIG. 6, according to the scanning order. The encoding apparatus, for example, may generate and encode various syntax elements related to residual information, as described above in Table 1. S900 and S910 may be included in the residual information encoding procedure of FIG. 2.

The encoding apparatus may perform binarization for residual-related syntax elements (S900). In an example, binarization according to the embodiments, which are described above in FIG. 6, may be performed for last_sig_coeff_x_prefix and last_sig_coeff_y_prefix. The last_sig_coeff_x_prefix and the last_sig_coeff_y_prefix may be derived based on the position of a last significant coefficient within the current block. Additionally, binarization may also be carried out on the remaining syntax elements of Table 1 according to a determined method. In another example, binarization may be performed on transform_skip_flag, last_sig_coeff_x_suffix, last_sig_coeff_y_suffix, coded_sub_block_flag, sig_coeff_flag, par_level_flag, rem_abs_gt1_flag, rem_abs_gt2_flag, coeff_sign_flag, mts_idx, and so on, according to a Fixed-length binarization process. And, binarization corresponding to abs_remainder may be performed on the abs_remainder.

The last_sig_coeff_x_prefix and last_sig_coeff_y_prefix may represent an example of a last significant coefficient prefix information on the position of a non-zero last transform coefficient, among the transform coefficients for the current block. More specifically, last_sig_coeff_x_prefix may represent an example of x-axis prefix information, which is one of the last significant coefficient prefix information, and last_sig_coeff_y_prefix may represent an example of y-axis prefix information, which is one of the last significant coefficient prefix information. During the binarization process on the last_sig_coeff_x_prefix and last_sig_coeff_y_prefix, 0 may be used as the value of cRiceParam. The encoding apparatus may derive a bin string for each of the last_sig_coeff_x_prefix and last_sig_coeff_y_prefix by performing the binarization procedure. The binarization procedure may be performed by a binarization unit (242) within the entropy encoder (240).

According to an embodiment, a c Max value for each of the last_sig_coeff_x_prefix and last_sig_coeff_y_prefix may be derived based on whether or not high-frequency zeroing is being applied. A detailed equation for deriving the c Max values has already been described above in FIG. 6. The c Max may represent a maximum length (or longest length) of a codeword (bin string) being derived during the binarization process on the last_sig_coeff_x_prefix or last_sig_coeff_y_prefix. In case of reducing the c Max value, a codeword length for the last_sig_coeff_x_prefix or last_sig_coeff_y_prefix may be effectively reduced. And, since the coded bin that is reduced by reducing the codeword is a context-coded bin, there may be advantages in the aspect of throughput.

The encoding apparatus may perform entropy encoding for syntax elements related to the residual coding (S910). The encoding apparatus may skip the transform coefficient scanning for the region having the above-described high-frequency zeroing applied thereto, and the encoding apparatus may not perform encoding on the coded_sub_block_flag for the region having the high-frequency zeroing applied thereto. That is, when generating a residual coding syntax (or bitstream), the encoding apparatus may not include a syntax element coded_sub_block_flag for a sub-block being located in the region having the high-frequency zeroing applied thereto. The encoding apparatus may perform encoding on the coded_sub_block_flag only for a region not having the high-frequency zeroing applied thereto. i.e., a top-left transform coefficient region (or low-frequency transform coefficient region) and may include the encoded coded_sub_block_flag in the residual coding syntax (or bitstream). By doing so, a number of bits being allocated to residual coding may be reduced.

The encoding apparatus may perform context-based or bypass-based encoding on the bin string based on an entropy coding scheme, such as context-adaptive arithmetic coding (CABAC) or context-adaptive variable length coding (CAVLC), and so on, and the corresponding output may be included in a bitstream. The entropy encoding procedure may be performed by an entropy encoding processor (244) within the entropy encoder (240). As described above, in addition to the residual information including information on the last_sig_coeff_x_prefix and the last_sig_coeff_y_prefix, the bitstream may include various information for performing image/video decoding, such as prediction information. The bitstream may be delivered to a decoding apparatus through a (digital) storage medium or network.

Figure 10A:
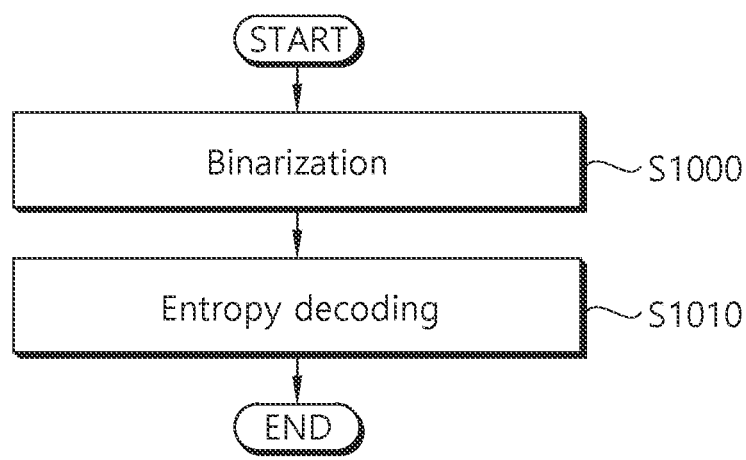
FIG. 10a and FIG. 10b are diagrams for describing configuration and operation of an entropy decoder according to an embodiment of the present specification.
Figure 10B:
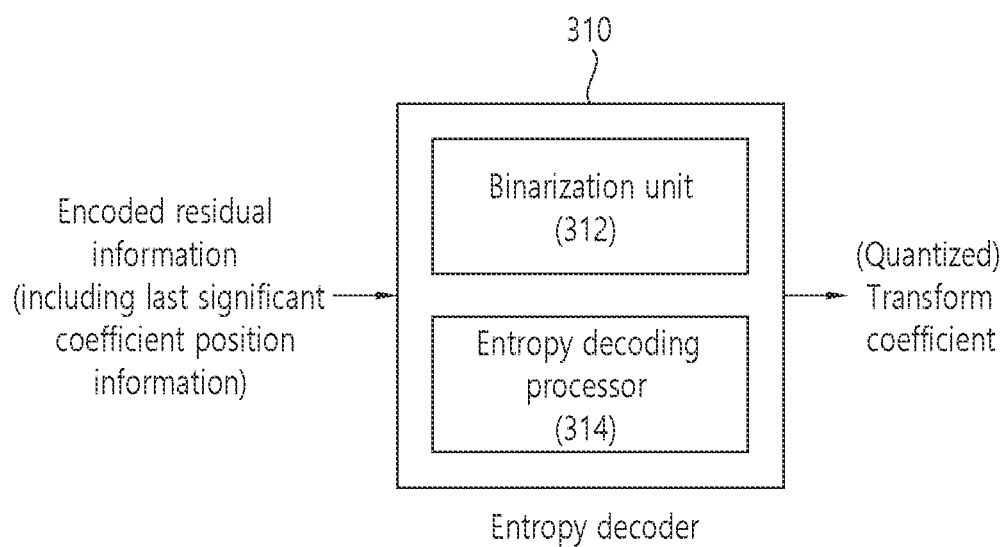

FIG. 10a and FIG. 10b are diagrams for describing configuration and operation of an entropy decoder according to an embodiment of the present specification.

Referring to FIG. 10a and FIG. 10b, a decoding apparatus (entropy decoder) may decode coded residual information so as to derive (quantized) transform coefficients. As described above in FIG. 6, the decoding apparatus may decode the coded residual information for the current block (current coding block (CB) or current transform block (FB)), so as to derive the (quantized) transform coefficients. For example, the decoding apparatus may decode various syntax elements related to residual information, as described above in Table 1, interpret values of related syntax elements, and derive the (quantized) transform coefficients based on the interpreted syntax element values. S1000 and S1010 may be included in the above-described procedure of deriving (quantized) transform coefficients of FIG. 3.

The decoding apparatus may perform binarization for residual-related syntax elements (S1000). For example, binarization that is based on the embodiments described above in FIG. 6 may be performed for last_sig_coeff_x_prefix and last_sig_coeff_y_prefix. At this point, 0 may be used as the value of cRiceParam. The decoding apparatus may derive available bin strings for each available value of the last_sig_coeff_x_prefix and last_sig_coeff_y_prefix by performing the binarization procedure. The binarization procedure may be performed by a binarization unit (312) within the entropy decoder (310). According to an embodiment, a c Max value for each of the last_sig_coeff_x_prefix and last_sig_coeff_y_prefix may be derived based on whether or not high-frequency zeroing is being applied. A detailed equation for deriving the c Max values has already been described above in FIG. 6.

The c Max may represent a maximum length (or longest length) of a codeword (bin string) being derived during the binarization process on the last_sig_coeff_x_prefix or last_sig_coeff_y_prefix. In case of reducing the c Max value, a codeword length for the last_sig_coeff_x_prefix or last_sig_coeff_y_prefix may be effectively reduced. And, since the coded bin that is reduced by reducing the codeword is a context-coded bin, there may be advantages in the aspect of throughput.

Meanwhile, binarization may also be carried out on the remaining syntax elements of Table 1 according to a determined method. For example, binarization may be performed on transform_skip_flag, last_sig_coeff_x_suffix, last_sig_coeff_y_suffix, coded_sub_block_flag, sig_coeff_flag, par_level_flag, rem_abs_gt1_flag, rem_abs_gt2_flag, coeff_sign_flag, mts_idx, and so on, according to a Fixed-length binarization process. And, binarization corresponding to abs_remainder may be performed on the abs_remainder.

The decoding apparatus may perform entropy decoding for syntax elements related to the residual coding (S1010). The decoding device may compare the derived bin string with the available bin strings by sequentially parsing and decoding each bin for each syntax element. If the derive bin string is the same as one of the available bin strings, a value corresponding to the corresponding bin string may be derived as the value of the corresponding syntax element. If the derive bin string is not the same as any one of the available bin strings, the decoding apparatus may perform the comparison procedure once again by further parsing and decoding a next bit within the bitstream. By performing the above-described process, specific information (specific syntax element) may be signaled by using a bit having a variable length without having to use a starting bit or ending bit for the corresponding information within the bitstream. And, by signaling the corresponding information, the decoding apparatus may allocate a relatively smaller number of bits to a lower value, thereby being capable of enhancing the overall coding efficiency.

The decoding apparatus may skip transform coefficient scanning for a region having high-frequency zeroing applied thereto, and the decoding apparatus may regard the coded_sub_block_flag for the region having high-frequency zeroing applied thereto as 0, without parsing and/or decoding the coded_sub_block_flag. That is, the decoding apparatus may infer that a last significant coefficient is not located in a subblock being located in the region having high-frequency zeroing applied thereto even without performing scanning. Additionally, the decoding apparatus may not perform parsing on the syntax element coded_sub_block_flag for the subblock being located in the region having high-frequency zeroing applied thereto from a residual coding syntax (or bitstream), and then the decoding apparatus may infer that the value of the syntax element coded_sub_block_flag is equal to 0.

Additionally, the decoding apparatus may infer that the syntax element coded_sub_block_flag being parsed and/or decoded within residual information (e.g., residual syntax) on the current block is not for a region having high-frequency zeroing applied thereto, and the decoding apparatus may infer that a syntax element coded_sub_block_flag being parsed and/or decoded for the first time within residual information (e.g., residual syntax) on the top-left transform block is a first subblock being derived based on a scanning order.

The decoding apparatus may perform context-based or bypass-based decoding on the bin string based on an entropy coding scheme, such as CABAC or CAVLC, and so on. The entropy decoding procedure may be performed by an entropy decoding processor (314) within the entropy decoder (310). The decoding apparatus may derive a position of the last significant coefficient based on the last_sig_coeff_x_prefix value and the last_sig_coeff_y_prefix value. Detailed calculation may, for example, be performed as shown below in Table 14.

TABLE 14

The column position of the last significant coefficient in scanning order within a transform block LastSignificantCoeffX is derived as follows:
    If last_sig_coeff_x_suffix is not present, the following applies:
LastSignificantCoeffX = last_sig_coeff_x_prefix
    Otherwise (last_sig_coeff_x_suffix is present), the following applies:
LastSignificantCoeffX= (1<<((last_sig_coeff_x_prefix>>1)−1)) * (2+(last_sig_coeff_x_prefix&1)) + last_sig_coeff_x_suffix
The row position of the last significant coefficient in scanning order within a transform block LastSignificantCoeffY is derived as follows:
    If last_sig_coeff_y_suffix is not present, the following applies:
LastSignificantCoeffY = last_sigcoeff_y_prefix
    Otherwise (last_sig_coeff_y_suffix is present), the following applies:
LastSignificantCoeffY=(1<<((last_sig_coeff_y_prefix>>1)−1))* (2+(last_sig_coeff_y_prefix&1))+last_sig_coeff_y_suffix In Table 14, LastSignificantCoeffX may indicate an x-axis position of a non-zero last significant coefficient within the current (transform) block, and LastSignificantCoeffY may indicate a y-axis position of a non-zero last significant coefficient within the current (transform) block.

As described above, in addition to the residual information including information on the last_sig_coeff_x_prefix and the last_sig_coeff_y_prefix, the bitstream may include various information for performing image/video decoding, such as prediction information. The bitstream may be delivered to a decoding apparatus through a (digital) storage medium or network.

The decoding apparatus may derive residual samples for the current block by performing dequantization and/or inverse transform procedure(s) based on the (quantized) transform coefficients. The residual samples and prediction samples being derived through inter/intra prediction may be generated, and a recovery picture including the recovery samples may be generated.

Additionally, in case the above-described high-frequency zeroing is performed, the present specification proposes an embodiment of determining context models of the above-described syntax elements last_sig_coeff_x_prefix and last_sig_coeff_y_prefix. More specifically, this embodiment proposes a solution for determining a context model by using Min(log 2TbWidth, 5) and Min(log 2TbHeight, 5), instead of log 2TbWidth and log 2TbHeight, which represent the horizontal (or width) size and the vertical (or height) size of a transform block, while considering a region being zeroed (or zeroed-out) during the high-frequency zeroing process. Herein, Min(log 2TbWidth, 5) may represent a smaller value between log 2TbWidth and 5, and Min(log 2TbHeight, 5) may represent a smaller value between log 2TbHeight and 5.

For example, according to the present embodiment, context models of the last_sig_coeff_x_prefix and last_sig_coeff_y_prefix may be derived as shown below in the following table.

TABLE 15

Derivation process of ctxInc for the syntax elements last_sig_coeff_x_prefix and last_sig_coeff_y_prefix'
Inputs to this process are the variable binIdx, the colour component index cIdx, the binary logarithm of the transform block width log2TbWidth and the transform block height log2TbHeight.
Output of this process is the variable ctxInc.
The variable log2TbSize is derived as follows:
    If the syntax element to be parsed is last_sig_coeff_x_prefix, log2TbSize is set equal to Min(log2TbWidth, 5).
    Otherwise (the syntax element to be parsed is last_sig_coeff_y_prefix), log2TbSize is set equal to Min(log2TbHeight, 5).
The variables ctxOffset and ctxShift are derived as follows:
    If cIdx is equal to 0, ctxOffset is set equal to 3 * ( log2TbSize − 2 ) + ( ( log2TbSize − 1 ) >> 2 ) and ctxShift is set equal to ( log2TbSize + 1 ) >> 2.
    Otherwise (cIdx is greater than 0), ctxOffset is set equal to 21 and ctxShift is set equal to Clip3( 0, 2, 2log2TbSize >> 3 ).
The variable ctxInc is derived as follows:
ctxInc = ( binIdx >> ctxShift ) + ctxOffset As shown in Table 15, which is presented above, a context index (ctxIdx) indicating the context model may be determined based on ctxInc. According to the present embodiment, ctxInc may be determined based on Min(log 2TbWidth, 5) and/or Min(log 2TbHeight, 5), and a context index indicating a context model may be determined based on the determined ctxInc. Herein, the Min(log 2TbWidth, 5) may represent a width (i.e., second horizontal length) of the above-described low-frequency transform coefficient, and the Min(log 2TbHeight, 5) may represent a height (i.e., second vertical length) of the above-described low-frequency transform coefficient. For example, in case a width of the current block is equal to 64, the log 2TbWidth may be derived as 6, and, accordingly, the Min(log 2TbWidth, 5) may be derived as 5. Herein, the value 5 may indicate that the derived width is equal to 32. That is, this may indicate that the width of the low-frequency transform coefficient region is derived as 32. Additionally, in case a height of the current block is equal to 64, the log 2TbHeight may be derived as 6, and, accordingly, the Min(log 2TbHeight, 5) may be derived as 5. Herein, the value 5 may indicate that the derived height is equal to 32. That is, this may indicate that the height of the low-frequency transform coefficient region is derived as 32.

Referring to Table 15, which is presented above, in case a last_sig_coeff_x_prefix is parsed, a log 2TbSize may be set to Min(log 2TbWidth, 5) for the last_sig_coeff_x_prefix. Thereafter, if cIdx is equal to 0, ctxOffset may be set to 3*(log 2TbSize−2)+((log 2TbSize−1)>>2), and ctxShift may be set to (log 2TbSize+1)>>2. And, if cIdx is greater than 0, ctxOffset may be set to 21, and ctxShift may be set to Clip3(0, 2, $2^{log\ 2TbSize}$>>3). Afterwards, a ctxInc for the last_sig_coeff_x_prefix may be set to (binIdx>>ctxShift)+ctxOffset. Similarly, in case a last_sig_coeff_y_prefix is parsed, a log 2TbSize may be set to Min(log 2TbHeight, 5) for the last_sig_coeff_y_prefix. Thereafter, if cIdx is equal to 0, ctxOffset may be set to 3*(log 2TbSize−2)+((log 2TbSize−1)>>2), and ctxShift may be set to (log 2TbSize+1)>>2. And, if cIdx is greater than 0, ctxOffset may be set to 21, and ctxShift may be set to Clip3(0, 2, $2^{log\ 2TbSize}$>>3). Afterwards, a ctxInc for the last_sig_coeff_y_prefix may be set to (binIdx>>ctxShift)+ctxOffset.

In other words, bins included in a bin string of the last_sig_coeff_x_prefix and bins included in a bin string of the last_sig_coeff_y_prefix may be processed with context-based coding based on a context model for each bin. And, in this case, the context model may be derived based on the ctxInc. The encoding apparatus may derive a value of syntax element last_sig_coeff_x_prefix and may derive binarization bins corresponding to the derived value by performing a binarization process. Thereafter, the encoding apparatus may encode the bins after deriving context models for each of the bins. The encoding apparatus may derive a value of syntax element last_sig_coeff_y_prefix and may derive binarization bins corresponding to the derived value by performing a binarization process. Thereafter, the encoding apparatus may encode the bins after deriving context models for each of the bins. In this case, a bit sequence having a length that is equal to or shorter than a length of binarization bins corresponding to the above-described value may be outputted in accordance with an arithmetic coding that is based on the context model. The decoding apparatus may derive candidate bin strings by performing a binarization process for the syntax element last_sig_coeff_x_prefix, and, by sequentially parsing the bits for the syntax element last_sig_coeff_x_prefix from a bitstream, the decoding apparatus may decode the bins for the syntax element last_sig_coeff_x_prefix. Herein, the decoding apparatus may decode the bins by deriving context models for each of the bins. Thereafter, the decoding apparatus may determine whether the decoded bins correspond to one of the candidate bin strings. And, in case the decoded bins correspond to one of the candidate bin strings, a value indicating the corresponding bin string may be derived as the value of the syntax element last_sig_coeff_x_prefix. Additionally, in case the decoded bins do not correspond to one of the candidate bin strings, the decoding apparatus may repeat the above-described procedure by additionally parsing bits for the syntax element last_sig_coeff_x_prefix. Additionally, the decoding apparatus may derive candidate bin strings by performing a binarization process for the syntax element last_sig_coeff_y_prefix, and, by sequentially parsing the bits for the syntax element last_sig_coeff_y_prefix from a bitstream, the decoding apparatus may decode the bins for the syntax element last_sig_coeff_y_prefix. Herein, the decoding apparatus may decode the bins by deriving context models for each of the bins. Thereafter, the decoding apparatus may determine whether the decoded bins correspond to one of the candidate bin strings. And, in case the decoded bins correspond to one of the candidate bin strings, a value indicating the corresponding bin string may be derived as the value of the syntax element last_sig_coeff_y_prefix. Additionally, in case the decoded bins do not correspond to one of the candidate bin strings, the decoding apparatus may repeat the above-described procedure by additionally parsing bits for the syntax element last_sig_coeff_y_prefix.

As described above, according to the embodiment of the present specification, when coding position information indicating a position of a last non-zero transform coefficient, i.e., last significant coefficient position information (the syntax element last_sig_coeff_x_prefix and the syntax element last_sig_coeff_y_prefix), ctxInc and/or ctxIdx may be differently determined based on Min(log 2TbWidth, 5) and/or Min(log 2TbHeight, 5). And, in this case, a different context model may be adaptively applied for a bin of the same bin index without signaling additional information.

Syntax elements of residual information being derived by applying the above-described embodiment may be indicated as shown below in the following table.

TABLE 16

| | Descriptor |
|---|---|
| residual_coding( x0, y0, log2TbWidth, log2TbHeight, cIdx ) { | |
|   if( transform_skip_enabled_flag && ( cIdx ! = 0 \|\| tu_mts_flag[ x0 ][ y0 ] = = 0 ) && | |
|     ( log2TbWidth <− 2 ) && ( log2TbHeight <− 2 ) ) | |
|     transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ac(v) |
|   log2SbSize = ( Min( log2TbWidth, log2TbHeight ) < 2 ? 1 : 2 ) | |
|   numSbCoeff = 1 << ( log2SbSize << 1 ) | |
|   lastScanPos = numSbCoeff | |
|   log2TbWidth = Min( log2TbWidth, 5 ) | |
|   log2TbHeight = Min( log2TbHeight, 5 ) | |

TABLE 16-continued

| | Descriptor |
|---|---|
| ```
lastSubBlock − ( 1 << ( log2TbWidth + log2TbHeight − 2 * log2SbSize ) ) − 1
do {
    if( lastScanPos = = 0 ) {
        lastScanPos = numSbCoeff
        lastSubBlock− −
    }
    lastScanPos− −
    xS = DiagScanOrder[ log2TbWidth − log2SbSize ][ log2TbHeight − log2SbSize ]
                     [ lastSubBlock ][ 0 ]
    yS = DiagScanOrder[ log2TbWidth − log2SbSize ][ log2TbHeight − log2SbSize ]
                     [ lastSubBlock ][ 1 ]
    xC = ( xS << log2SbSize ) +
             DiagScanOrder[ log2SbSize ][ log2SbSize ][ lastScanPos ][ 0 ]
    yC − ( yS << log2SbSize ) +
             DiagScanOrder[ log2SbSize ][ log2SbSize ][ lastScanPos ][ 1 ]
} while( ( xC != LastSignificantCoeffX ) || ( yC != LastSignificantCoeffY ) )
numSigCoeff= 0
QState − 0
for( i = lastSubBlock; i >= 0; i− − ) {
    startQStateSb = QState
    xS = DiagScanOrder[ log2TbWidth − log2SbSize ][ log2TbHeight − log2SbSize ]
                     [ lastSubBlock ][ 0 ]
    yS = DiagScanOrder[ log2TbWidth − log2SbSize ][ log2TbHeight − log2SbSize ]
                     [ lastSubBlock ][ 1 ]
    inferSbDcSigCoeffFlag = 0
    if( ( i < lastSubBlock ) && ( i > 0 ) ) {
        coded_sub_block_flag[ xS ][ yS ]
        inferSbDcSigCoeffFlag = 1
    }
    firstSigScanPosSb = numSbCoeff
    lastSigScanPosSb = −1
    remBinsPass1 = ( log2SbSize < 2 ? 6 : 28 )
    remBinsPass2 = ( log2SbSize < 2 ? 2 : 4 )
    firstPosMode0 − ( i − − lastSubBlock ? lastScanPos − 1 : numSbCoeff − 1 )
    firstPosMode1 = −1
    firstPosMode2 = −1
    for( n = ( i = = firstPosMode0; n >= 0 && remBinsPass1 >= 3; n− − ) {
        xC = ( xS << log2SbSize ) − DiagScanOrder[ log2SbSize ][ log2SbSize ][ n ][ 0 ]
        yC − ( yS << log2SbSize ) − DiagScanOrder[ log2SbSize ][ log2SbSize ][ n ][ 1 ]
        if( coded_sub_block_flag[ xS ][ yS ] && ( n > 0 || !inferSbDcSigCoeffFlag ) ) {
            sig_coeff_flag[ xC ][ yC ]
            remBinsPass1− −
            if( sig_coeff_flag[ xC ][ yC ] )
                inferSbDcSigCoeffFlag − 0
        }
        if( sig_coeff_flag[ xC ][ yC ] ) {
            numSigCoeff++
            abs_level_gt1_flag[ n ]
            remBinsPass1− −
            if( abs_level_gt1_flag[ n ] ) {
                par_level_flag[ n ]
                remBinsPass1− −
                if( remBinsPass2 > 0 ) {
                    remBinsPass2− −
                    if( remBinsPass2 − − 0 )
                        firstPosMode1 = n − 1
                }
            }
            if( lastSigScanPosSb = = −1 )
                lastSigScanPosSb − n
            firstSigScanPosSb = n
        }
        AbsLevelPass1[ xC ][ yC ]
             sig_coeff_flag[ xC ][ yC ] + par_level_flag[ n ] + abs_level_gt1_flag[ n ]
        if( dep_quant_enabled_flag )
            QState = QStateTransTable[ QState ][ AbsLevelPass1[ xC ][ yC ] & 1 ]
        if( remBinsPass1 < 3 )
            firstPosMode2 = n − 1
    }
    if( firstPosMode1 < firstPosMode2 )
        firstPosMode1 = firstPosMode2
    for( n = numSbCoeff − 1; n >= firstPosMode2; n− − )
        if( abs_level_gt1_flag[ n ] )
            abs_level_gt3_flag[ n ]
``` | <br><br><br><br><br><br><br><br><br><br><br><br><br><br><br><br><br><br><br><br><br><br><br><br><br>ae(v)<br><br><br><br><br><br><br><br><br>ae(v)<br><br><br>ae(v)<br><br>ae(v)<br><br><br><br><br><br><br><br><br><br><br><br><br><br><br><br><br><br><br>ae(v) |

TABLE 16-continued

| | Descriptor |
|---|---|
| ```
        for( n = numSbCoeff − 1; n >= firstPosMode1; n− − ) {
            xC = ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2SbSize ][ n ][ 1 ]
            if( abs_level_gt3_flag[ n ] )
                abs_remainder[ n ]
            AbsLevel[ xC ][ yC ] = AbsLevelPass1[ xC ][ yC ] +
                                    2 * ( abs_level_gt3_flag[ n ] + abs_remainder[ n ] )
        }
        for( n = firstPosMode1; n > firstPosMode2; n− − ) {
            xC = ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2SbSize ][ n ][ 1 ]
            if( abs_level_gt1_flag[ n ] )
                abs_remainder[ n ]
            AbsLevel[ xC ][ yC ] = AbsLevelPass1[ xC ][ yC ] + 2 * abs_remainder[ n ]
        }
        for( n = firstPosMode2; n >= 0; n− − ) {
            xC − ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2SbSize ][ n ][ 1 ]
            dec_abs_level[ n ]
            if( AbsLevel[ xC ][ yC ] > 0 )
                firstSigScanPosSb = n
            if( dep_quant_enabled_flag )
                QState = QStateTransTable[ QState ][ AbsLevel[ xC ][ yC ] & 1 ]
        }
        if( dep_quant_enabled_flag | | !sign_data_hiding_enabled_flag )
            signHidden = 0
        else
            signHidden = ( lastSigScanPosSb − firstSigScanPosSb > 3 ? 1 : 0 )
        for( n = numSbCoeff − 1; n >= 0; n− − ) {
            xC = ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2SbSize ][ n ][ 1 ]
            if( sig_coeff_flag[ xC ][ yC ] &&
                ( !signHidden | ( n != firstSigScanPosSb ) ) )
                coeff_sign_flag[ n ]
        }
        if( dep_quant_enabled_flag ) {
            QState − startQStateSb
            for( n = numSbCoeff − 1; n >= n− − ) {
                xC = ( xS << log2SbSize ) −
                        DiagScanOrder[ log2SbSize ][ log2SbSize ][ n ][ 0 ]
                yC = ( yS << log2SbSize ) −
                        DiagScanOrder[ log2SbSize ][ log2SbSize ][ n ][ 1 ]
                if( sig_coeff_flag[ xC ][ yC ] )
                    TransCoeffLevel[ x0 ][ y0 ][ cIdx ][ xC ][ yC ] −
                        ( 2 * AbsLevel[ xC ][ yC ] − ( QState > 1 ? 1 : 0 ) ) *
                        ( 1 − 2 * coeff_sign_flag[ n ] )
                QState = QStateTransTable[ QState ][ par_level_flag[ n ] ]
            }
        } else {
            sumAbsLevel = 0
            for( n = numSbCoeff − 1; n >= 0; n− − ) {
                xC −( xS << log2SbSize ) −
                        DiagScanOrder[ log2SbSize ][ log2SbSize ][ n ][ 0 ]
                yC = ( yS << log2SbSize ) −
                        DiagScanOrder[ log2SbSize ][ log2SbSize ][ n ][ 1 ]
                if( sig_coeff_flag[ xC ][ yC ] ) {
                    TransCoeffLevel[ x0 ][ y0 ][ cIdx ][ xC ][ yC ] =
                        AbsLevel[ xC ][ yC ] * ( 1 − 2 * coeff_sign_flag[ n ] )
                    if( signHidden ) {
                        sumAbsLevel += AbsLevel[ xC ][ yC ]
                        if( ( n = = firstSigScanPosSb ) && ( sumAbsLevel % 2 ) = = 1 ) )
                            TransCoeffLevel[ x0 ][ y0 ][ cIdx ][ xC ][ yC ] =
                                −TransCoeffLevel[ x0 ][ y0 ][ cIdx ][ xC ][ yC ]
                    }
                }
            }
        }
    }
    if( tu_mts_flag[ x0 ][ y0 ] && ( cIdx = = 0 ) )
        mts_idx[ x0 ][ y0 ][ cIdx ]
}
``` | ae(v)<br><br><br><br><br><br>ae(v)<br><br><br><br><br>ae(v)<br><br><br><br><br><br><br><br><br><br><br>ae(v)<br><br><br><br><br><br><br><br><br><br><br><br><br><br><br><br><br><br><br><br><br><br><br><br><br><br><br>ae(v) |

TABLE 17

| Syntax structure | Syntax element | Binarization | |
|---|---|---|---|
| | | Process | Input parameters |
| tile_group_data( ) | end_of_tile_group_flag | FL | cMax = 1 |
| coding_tree_unit( ) | alf_ctb_flag[ ][ ][ ] | FL | cMax = 1 |
| sao( ) | sao_merge_left_flag | FL | cMax = 1 |
| | sao_merge_up_flag | FL | cMax = 1 |
| | sao_type_idx_luma | TR | cMax = 2, cRiceParam = 0 |
| | sao_type_idx_chroma | TR | cMax = 2, cRiceParam = 0 |
| | sao_offset_abs[ ][ ][ ][ ] | TR | cMax = ( 1 << ( Min( bitDepth, 10 ) − 5 ) ) − 1, cRiceParam = 0 |
| | sao_offset_sign[ ][ ][ ][ ] | FL | cMax = 1 |
| | sao_band_position[ ][ ] | FL | cMax = 31 |
| | sao_eo_class_luma | FL | cMax = 3 |
| | sao_eo_class_chroma | FL | cMax = 3 |
| coding_quadtree( ) | qt_split_cu_flag[ ][ ] | FL | cMax = 1 |
| multi_type_tree( ) | mtt_split_cu_flag | FL | cMax = 1 |
| | mtt_split_cu_vertical_flag | FL | cMax = 1 |
| | mtt_split_cu_binary_flag | FL | cMax = 1 |

Additionally, semantics of the syntax elements having the above-described embodiment applied thereto may be represented as shown below in the following table.

TABLE 18

Residual coding semantics'
last_sig_coeff_x_prefix specifies the prefix of the column position of the last significant coefficient in scanning order within a transform block. The values of last_sig_coeff_x_prefix shall be in the range of 0 to ( Min( log2TbWidth, 5 ) << 1 ) − 1, inclusive.
last_sig_coeff_y_prefix specifies the prefix of the row position of the last significant coefficient in scanning order within a transform block. The values of last_sig_coeff_y_prefix shall be in the range of 0 to ( Min( log2TbHeight, 5 ) << 1 ) − 1, inclusive.

Figure 11:
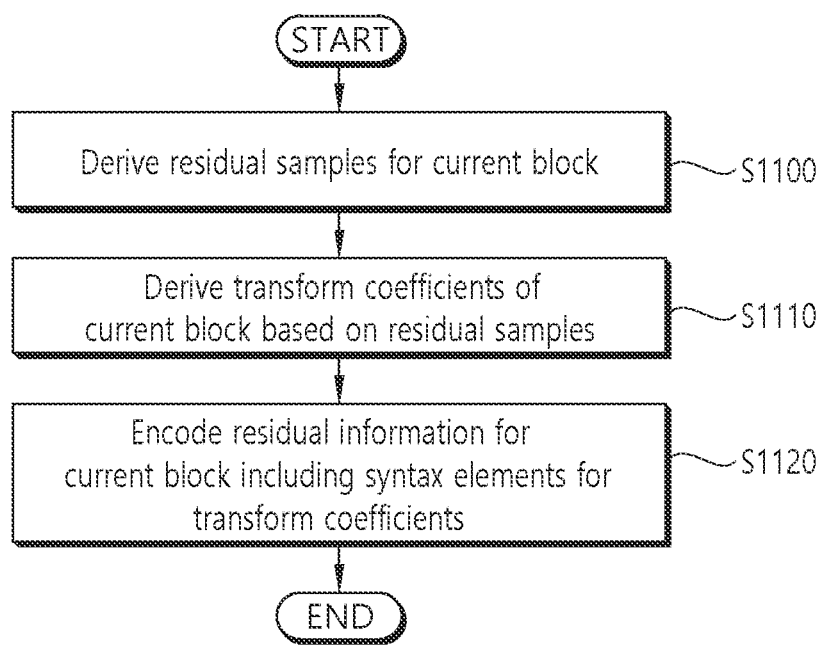
FIG. 11 broadly shows an image encoding method performed by an encoding apparatus according to the present specification.

FIG. 11 broadly shows an image encoding method performed by an encoding apparatus according to the present specification. The method disclosed in FIG. 11 may be performed by an encoding apparatus, which is disclosed in FIG. 2. More specifically, for example, S1100 of FIG. 11 may be performed by a subtractor of the encoding apparatus, S1110 may be performed by a transformer and quantizer of the encoding apparatus, and S1120 may be performed by an entropy encoder of the encoding apparatus. Additionally, although it is not shown in the drawing, a process of deriving a prediction sample may be performed by a predictor of the encoding apparatus. A process of deriving recovery samples for the current block based on residual samples and prediction samples for the current block may be performed by an adder of the encoding apparatus. And, a process of encoding prediction information on the current block may be performed by an entropy encoder of the encoding apparatus.

The encoding apparatus derives residual samples for the current block (S1100). The encoding apparatus may determine whether to perform inter prediction or to perform intra prediction on a current block, and the encoding apparatus may determine a detailed inter prediction mode or a detailed intra prediction mode based on an RD cost. Then, in accordance with the determined mode, the encoding apparatus may derive prediction samples on the current block and may derive the residual samples by performing subtraction of original samples for the current block and the prediction samples.

The encoding apparatus derives transform coefficients of the current block based on the residual samples (S1110). The encoding apparatus may derive the transform coefficients based on the residual samples of the current block.

For example, the encoding apparatus may determine whether or not transform is being applied to the residual samples. In case transform is not being applied to the residual samples, the encoding apparatus may derive the derived residual samples as the transform coefficients. Additionally, in case transform is being applied to the residual samples, the encoding apparatus may perform transform on the derived residual samples, so as to derive the transform coefficients. The transform coefficients may be included in a subblock of the current block. The subblock may be referred to as a coefficient group (CG). Additionally, a size of the subblock of the current block may be a 4×4 size or a 2×2 size. That is, the subblock of the current block may include a maximum of 16 non-zero transform coefficients or a maximum of 4 non-zero transform coefficients.

Meanwhile, for example, the current block may include a low-frequency transform coefficient region and a high-frequency transform coefficient region. The high-frequency transform coefficient region may represent a region being configured of transform coefficient 0, and the low-frequency transform coefficient region may represent a region including at least one significant transform coefficient (i.e., a non-zero transform coefficient). For example, the encoding apparatus may derive transform coefficients related to the low-frequency transform coefficient region by performing transform coefficient scanning in the low-frequency transform coefficient region. And, in the high-frequency transform coefficient region, instead of performing the transform coefficient scanning, the encoding apparatus derive the transform coefficients related to the high-frequency transform coefficient region as transform coefficient each having a transform coefficient level of 0. That is, among the transform coefficients for the current block, transform coefficient scanning may be performed on the transform coefficients being related to the low-frequency transform coefficient region. Furthermore, for example, the transform coefficient scanning may not be performed on the transform coefficients being related to the high-frequency transform coefficient region.

Meanwhile, according to an embodiment, the encoding apparatus may derive the low-frequency transform coefficient region based on the size of the current block. The high-frequency transform coefficient region may be derived as a region excluding the low-frequency transform coefficient region from the current block.

For example, a width of the low-frequency transform coefficient region or a height of the low-frequency transform coefficient region may be less than 32. For example, in case the width of the current block is less than 32, the width of the low-frequency transform coefficient region may be determined to be the same as the width of the current block. That is, based on the determination that the width of the current block is less than 32, the width of the low-frequency transform coefficient region may be determined to be the same as the width of the current block. Additionally, in case the height of the current block is less than 32, the height of the low-frequency transform coefficient region may be determined to be the same as the height of the current block. That is, based on the determination that the height of the current block is less than 32, the height of the low-frequency transform coefficient region may be determined to be the same as the height of the current block. Additionally, for example, in case the width of the current block is equal to or greater than 32, the width of the low-frequency transform coefficient region may be determined to be equal to 32. That is, based on the determination that the width of the current block is equal to or greater than 32, the width of the low-frequency transform coefficient region may be determined to be equal to 32. Additionally, in case the height of the current block is equal to or greater than 32, the height of the low-frequency transform coefficient region may be determined to be equal to 32. That is, based on the determination that the height of the current block is equal to or greater than 32, the height of the low-frequency transform coefficient region may be determined to be equal to 32.

According to an embodiment, the width of the low-frequency transform coefficient region and the height of the low-frequency transform coefficient region may be determined based on Equation 16, which will be described later on.

Meanwhile, the encoding apparatus may generate and encode a transform skip flag indicating a transform application or non-application on transform coefficients of the current block. A bitstream may include a transform skip flag for the current block. The transform skip flag may indicate a transform application or non-application on transform coefficients of the current block. That is, the transform skip flag may indicate whether or not a transform is applied to the transform coefficients. A syntax element indicating the transform skip flag may be the above-mentioned transform_skip_flag.

The encoding apparatus encodes residual information on the current block including syntax elements for the transform coefficients (S1120). The encoding apparatus may generate and encode residual information on the current block including syntax elements for the transform coefficients.

For example, the residual information may include syntax elements for the current block. Herein, the syntax elements may include syntax elements being coded based on a context model and bypass-coded syntax elements (i.e., syntax elements being coded based on a uniform probability distribution).

For example, the residual information may include syntax elements, such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, abs_level_gt1_flag, abs_level_gtX_flag, abs_remainder, coeff_sign_flag, dec_abs_level, and/or mts_idx, and so on.

More specifically, for example, the residual information may include a transform skip flag for the current block. The transform skip flag may indicate a transform application or non-application on transform coefficients of the current block. That is, the transform skip flag may indicate whether or not a transform is applied to the transform coefficients. A syntax element indicating the transform skip flag may be the above-mentioned transform_skip_flag.

Additionally, for example, the residual information may include last significant coefficient position information indicating a position of a last non-zero transform coefficient in a transform coefficient array of the current block. That is, for example, the syntax elements may include last significant coefficient prefix information and/or last significant coefficient suffix information on a position of a non-zero last significant transform coefficient, among the transform coefficients for the current block. The last significant coefficient prefix information may include x-axis prefix information and y-axis prefix information. A syntax element indicating the x-axis prefix information may be the above-described last_sig_coeff_x_prefix, and a syntax element indicating the y-axis prefix information may be the above-described last_sig_coeff_y_prefix. Additionally, the last significant coefficient suffix information may include x-axis suffix information and y-axis suffix information. A syntax element indicating the x-axis suffix information may be the above-described last_sig_coeff_x_suffix, and a syntax element indicating the y-axis suffix information may be the above-described last_sig_coeff_y_suffix. Meanwhile, a non-zero transform coefficient may also be referred to as a significant coefficient.

Additionally, for example, the residual information may include a coded subblock flag representing whether transform coefficient levels of transform coefficients for a subblock within the current block is equal to 0, and the subblock may be related to a low-frequency transform coefficient region. That is, the subblock may be included in the low-frequency transform coefficient region. The coded subblock flag may be the above-described coded_sub_block_flag.

Additionally, for example, the residual information may include syntax elements being coded based on context for transform coefficients within a subblock of the current block. The syntax elements may include a significant coefficient flag indicating whether or not the current transform coefficient is a non-zero transform coefficient, a parity level flag related to a parity of a transform coefficient level for the transform coefficient, a first transform coefficient level flag indicating whether or not the transform coefficient level is greater than a first threshold value, and a second transform coefficient level flag indicating whether or not the transform coefficient is greater than a second threshold value. Herein, the significant coefficient flag may be sig_coeff_flag, the parity level flag may be par_level_flag, the first transform coefficient level flag may be abs_level_gt1_flag, and the second transform coefficient level flag may be abs_level_gt3_flag or abs_level_gtx_flag.

Alternatively, for example, the syntax elements may include a significant coefficient flag indicating whether or not the current transform coefficient is a non-zero transform coefficient, a sign flag indicating a sign of the transform coefficient, a first transform coefficient level flag indicating whether or not the transform coefficient level is greater than a first threshold value, and a parity level flag related to a parity of a transform coefficient level for the transform coefficient. Herein, the significant coefficient flag may be sig_coeff_flag, the sign flag may be coeff_sign_flag, the first transform coefficient level flag may be abs_level_gt1_flag, and the parity level flag may be par_level_flag.

Additionally, for example, the residual information may include syntax elements being coded based on bypass transform coefficients within the subblock of the current block. The syntax elements may include information related to coefficient values related to values of the transform coefficients. The information related to coefficient values may be abs_remainder and/or dec_abs_level.

For example, the encoding apparatus may derive a context model for a syntax element that is coded by context-based coding. And, the encoding apparatus may encode the syntax element based on the derived context model.

For example, the syntax elements may include last significant coefficient prefix information related to a position of a last significant transform coefficient, among the transform coefficients for the current block. Herein, a context model for the significant coefficient prefix information may be derived based on a height and width of the low-frequency transform coefficient region. More specifically, the significant coefficient prefix information may include the x-axis prefix information and the y-axis prefix information. And, a context model for the x-axis prefix information may be derived based on the width of the low-frequency transform coefficient region, and a context model for the y-axis prefix information may be derived based on the height of the low-frequency transform coefficient region.

Additionally, for example, the position of the last significant transform coefficient may be determined based on a prefix codeword indicating the last significant coefficient prefix information and the last significant coefficient suffix information. And, a maximum length of the prefix codeword may be determined based on a size of the low-frequency transform coefficient region. The last significant coefficient prefix information may include x-axis prefix information and y-axis prefix information, and the prefix codeword may be a codeword for the x-axis prefix information or a codeword for the y-axis prefix information.

For example, based on the determination that the width of the low-frequency transform coefficient region is equal to 32, a maximum length of the codeword indicating the x-axis prefix information may be determined to be equal to 9. Additionally, for example, based on the determination that the height of the low-frequency transform coefficient region is equal to 32, a maximum length of the codeword indicating the y-axis prefix information may be determined to be equal to 9. Additionally, for example, based on the determination that the width of the current block is greater than 32, and that the width of the low-frequency transform coefficient region is equal to 32, a maximum binarized value of the codeword for the x-axis prefix information of the low-frequency transform coefficient region may be determined as 111111111. Additionally, for example, based on the determination that the height of the current block is greater than 32, and that the height of the low-frequency transform coefficient region is equal to 32, a maximum binarized value of the codeword for the y-axis prefix information of the low-frequency transform coefficient region may be determined as 111111111. Additionally, for example, a maximum length of the codeword for the x-axis prefix information may be determined based on the above-described Equation 14. Additionally, for example, the width of the low-frequency transform coefficient region is equal to 32, and a maximum length of the codeword for the x-axis prefix information may be determined based on the above-described Equation 15. According to the embodiment, the prefix codeword may be a truncated rice code that is based on a truncated rice binarization process.

Additionally, for example, the encoding apparatus may perform bypass-based encoding on a syntax element that is coded based on a bypass. That is, the encoding apparatus may perform encoding, based on a uniform probability distribution, on the syntax element being coded based on bypass. The syntax element being coded based on bypass may include last significant coefficient suffix information related to a position of a last significant transform coefficient, among the transform coefficients for the current block. The significant coefficient suffix information may include the x-axis suffix information and the y-axis suffix information.

Meanwhile, the encoding apparatus may generate and output a bitstream including the residual information.

Additionally, the bitstream may include prediction information on the current block. The prediction information may include information on an inter prediction mode or intra prediction mode being performed on the current block. The encoding apparatus may generate and encode prediction information on the current block.

Meanwhile, the bitstream may be transmitted through a network or may be transmitted to a (digital) storage medium. Herein, the network may include a broadcasting network and/or a communication network, and so on, and the digital storage medium may include various storage media, such as USB, SD, CD, DVD, Blu-ray, HDD, SSD, and so on.

Figure 12:
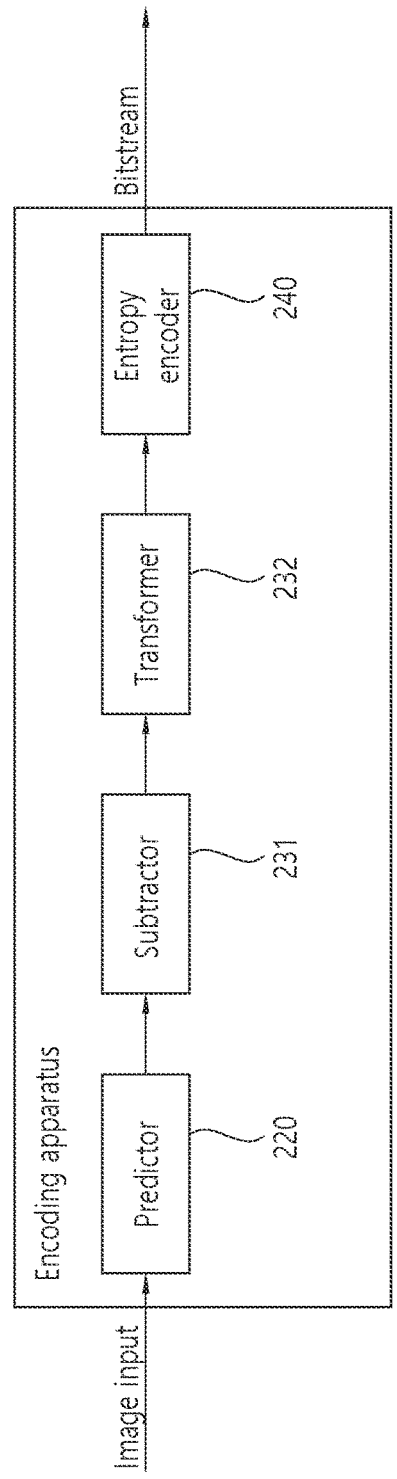
FIG. 12 broadly shows an encoding apparatus performing an image encoding method according to the present specification.

FIG. 12 broadly shows an encoding apparatus performing an image encoding method according to the present specification. The method disclosed in FIG. 11 may be performed by an encoding apparatus, which is disclosed in FIG. 12. More specifically, for example, a subtractor of the encoding apparatus of FIG. 12 may perform S1100 of FIG. 11, a transformer and quantizer of the encoding apparatus of FIG. 12 may perform S1110 of FIG. 11, and an entropy encoder of the encoding apparatus of FIG. 12 may perform S1120 of FIG. 11. Additionally, although it is not shown in the drawing, a process of deriving a prediction sample may be performed by a predictor of the encoding apparatus. A process of deriving recovery samples for the current block based on residual samples and prediction samples for the current block may be performed by an adder of the encoding apparatus. And, a process of encoding prediction information on the current block may be performed by an entropy encoder of the encoding apparatus.

Figure 13:
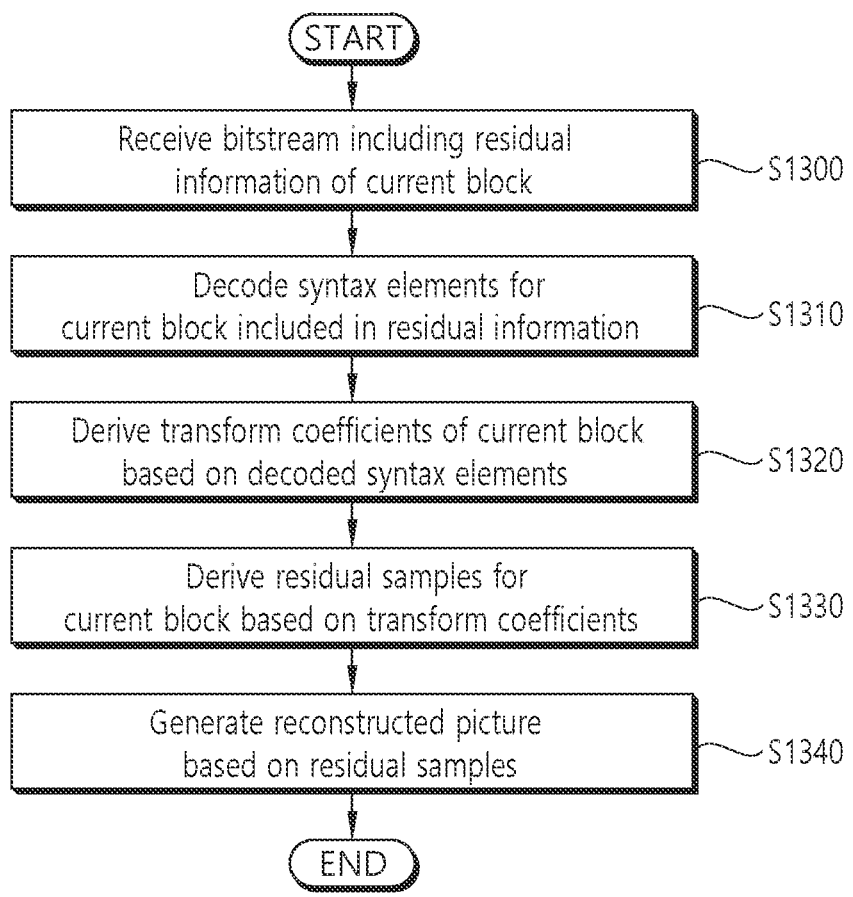
FIG. 13 broadly shows an image decoding method performed by a decoding apparatus according to the present specification.

FIG. 13 broadly shows an image decoding method performed by a decoding apparatus according to the present specification. The method disclosed in FIG. 13 may be performed by a decoding apparatus, which is disclosed in FIG. 3. More specifically, for example, S1300 to S1310 of FIG. 13 may be performed by an entropy decoder of the decoding apparatus, S1320 to S1330 may be performed by a dequantizer and inverse transformer of the decoding apparatus, and S1340 may be performed by an adder of the decoding apparatus. Additionally, although it is not shown in the drawing, a process of deriving a prediction sample may be performed by a predictor of the decoding apparatus.

The decoding apparatus receives a bitstream including residual information of the current block (S1300). The decoding apparatus may receive image information including residual information on the current block through a bitstream. Herein, the current block may be a Coding Block (CB) or a Transform Block (TB).

Additionally, for example, the current block may include may include a low-frequency transform coefficient region and a high-frequency transform coefficient region. The high-frequency transform coefficient region may represent a region being configured of transform coefficient 0, and the low-frequency transform coefficient region may represent a region including at least one significant transform coefficient (i.e., a non-zero transform coefficient). The low-frequency transform coefficient region may be determined based on the size of the current block, as described above, and the high-frequency transform coefficient region may be determined as a region excluding the low-frequency transform coefficient region from the current block. Meanwhile, the transform coefficient 0 may indicate a transform coefficient having a transform coefficient that is equal to 1. That is, the transform coefficient 0 may indicate a transform coefficient having the value of 0.

In this embodiment, a width of the low-frequency transform coefficient region or a height of the low-frequency transform coefficient region may be less than 32. For example, in case the width of the current block is less than 32, the width of the low-frequency transform coefficient region may be determined to be the same as the width of the current block. That is, based on the determination that the width of the current block is less than 32, the width of the low-frequency transform coefficient region may be determined to be the same as the width of the current block. Additionally, in case the height of the current block is less than 32, the height of the low-frequency transform coefficient region may be determined to be the same as the height of the current block. That is, based on the determination that the height of the current block is less than 32, the height of the low-frequency transform coefficient region may be determined to be the same as the height of the current block. Additionally, for example, in case the width of the current block is equal to or greater than 32, the width of the low-frequency transform coefficient region may be determined to be equal to 32. That is, based on the determination that the width of the current block is equal to or greater than 32, the width of the low-frequency transform coefficient region may be determined to be equal to 32. Additionally, in case the height of the current block is equal to or greater than 32, the height of the low-frequency transform coefficient region may be determined to be equal to 32. That is, based on the determination that the height of the current block is equal to or greater than 32, the height of the low-frequency transform coefficient region may be determined to be equal to 32.

In this embodiment, the width of the low-frequency transform coefficient region and the height of the low-frequency transform coefficient region may be determined based on Equation 16 as shown below.

$$\log 2(ZoTbWidth) = \text{Min}(\log 2(TbWidth), 5)$$

$$\log 2(ZoTbHeight) = \text{Min}(\log 2(TbHeight), 5) \quad \text{[Equation 16]}$$

In Equation 16, the ZoTbWidth may represent the width of the low-frequency transform coefficient region, and the ZoTbHeight may represent the height of the low-frequency transform coefficient region. And, the TbWidth may represent a width of the current block, and the TbHeight may represent a height of the current block.

Additionally, for example, the residual information may include syntax elements for the current block. Herein, the syntax elements may include syntax elements being coded based on a context model and bypass-coded syntax elements (i.e., syntax elements being coded based on a uniform probability distribution).

For example, the residual information may include syntax elements, such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, abs_level_gt1_flag, abs_level_gtX_flag, abs_remainder, coeff_sign_flag, dec_abs_level, and/or mts_idx, and so on.

More specifically, for example, the residual information may include a transform skip flag for the current block. The transform skip flag may indicate a transform application or non-application on transform coefficients of the current block. That is, the transform skip flag may indicate whether or not a transform is applied to the transform coefficients. A syntax element indicating the transform skip flag may be the above-mentioned transform_skip_flag.

Additionally, for example, the residual information may include last significant coefficient position information indicating a position of a last non-zero transform coefficient in a transform coefficient array of the current block. That is, for example, the syntax elements may include last significant coefficient prefix information and/or last significant coefficient suffix information on a position of a non-zero last significant transform coefficient, among the transform coefficients for the current block. The last significant coefficient prefix information may include x-axis prefix information and y-axis prefix information. A syntax element indicating the x-axis prefix information may be the above-described last_sig_coeff_x_prefix, and a syntax element indicating the y-axis prefix information may be the above-described last_sig_coeff_y_prefix. Additionally, the last significant coefficient suffix information may include x-axis suffix information and y-axis suffix information. A syntax element indicating the x-axis suffix information may be the above-described last_sig_coeff_x_suffix, and a syntax element indicating the y-axis suffix information may be the above-described last_sig_coeff_y_suffix. Meanwhile, a non-zero transform coefficient may also be referred to as a significant coefficient.

Additionally, for example, the residual information may include a coded subblock flag representing whether transform coefficient levels of transform coefficients for a subblock within the current block is equal to 0, and the subblock may be related to a low-frequency transform coefficient region. That is, the subblock may be included in the low-frequency transform coefficient region. The coded subblock flag may be the above-described coded_sub_block_flag.

Additionally, for example, the residual information may include syntax elements being coded based on context for transform coefficients within a subblock of the current block. The syntax elements may include a significant coefficient flag indicating whether or not the current transform coefficient is a non-zero transform coefficient, a parity level flag related to a parity of a transform coefficient level for the transform coefficient, a first transform coefficient level flag indicating whether or not the transform coefficient level is greater than a first threshold value, and a second transform coefficient level flag indicating whether or not the transform coefficient is greater than a second threshold value. Herein, the significant coefficient flag may be sig_coeff_flag, the parity level flag may be par_level_flag, the first transform coefficient level flag may be abs_level_gt1_flag, and the second transform coefficient level flag may be abs_level_gt3_flag or abs_level_gtx_flag.

Alternatively, for example, the syntax elements may include a significant coefficient flag indicating whether or not the current transform coefficient is a non-zero transform coefficient, a sign flag indicating a sign of the transform coefficient, a first transform coefficient level flag indicating whether or not the transform coefficient level is greater than a first threshold value, and a parity level flag related to a parity of a transform coefficient level for the transform coefficient. Herein, the significant coefficient flag may be sig_coeff_flag, the sign flag may be coeff_sign_flag, the first transform coefficient level flag may be abs_level_gt1_flag, and the parity level flag may be par_level_flag.

Additionally, for example, the residual information may include syntax elements being coded based on bypass transform coefficients within the subblock of the current block. The syntax elements may include information related to coefficient values related to values of the transform coefficients. The information related to coefficient values may be abs_remainder and/or dec_abs_level.

Meanwhile, the bitstream may include prediction information on the current block. The prediction information may include information on an inter prediction mode or intra prediction mode being performed on the current block. The decoding apparatus may perform inter prediction or intra prediction on the current block based on the prediction information, which is received through the bitstream, and the decoding apparatus may derive prediction samples of the current block.

The decoding apparatus decodes syntax elements for the current block being included in the residual information (S1310).

For example, the decoding apparatus may derive a context model for a syntax element that is coded by context-based coding. And, the decoding apparatus may decode the syntax element based on the derived context model.

For example, the syntax elements may include last significant coefficient prefix information related to a position of a last significant transform coefficient, among the transform coefficients for the current block. Herein, a context model for the significant coefficient prefix information may be derived based on a height and width of the low-frequency transform coefficient region. More specifically, the significant coefficient prefix information may include the x-axis prefix information and the y-axis prefix information. And, a context model for the x-axis prefix information may be derived based on the width of the low-frequency transform coefficient region, and a context model for the y-axis prefix information may be derived based on the height of the low-frequency transform coefficient region.

Additionally, for example, the position of the last significant transform coefficient may be determined based on a prefix codeword indicating the last significant coefficient prefix information and the last significant coefficient suffix information. And, a maximum length of the prefix codeword may be determined based on a size of the low-frequency transform coefficient region. The last significant coefficient prefix information may include x-axis prefix information and y-axis prefix information, and the prefix codeword may be a codeword for the x-axis prefix information or a codeword for the y-axis prefix information.

For example, based on the determination that the width of the low-frequency transform coefficient region is equal to 32, a maximum length of the codeword indicating the x-axis prefix information may be determined to be equal to 9. Additionally, for example, based on the determination that the height of the low-frequency transform coefficient region is equal to 32, a maximum length of the codeword indicating the y-axis prefix information may be determined to be equal to 9. Additionally, for example, based on the determination that the width of the current block is greater than 32, and that the width of the low-frequency transform coefficient region is equal to 32, a maximum binarized value of the codeword for the x-axis prefix information of the low-frequency transform coefficient region may be determined as 111111111. Additionally, for example, based on the determination that the height of the current block is greater than 32, and that the height of the low-frequency transform coefficient region is equal to 32, a maximum binarized value of the codeword for the y-axis prefix information of the low-frequency transform coefficient region may be determined as 111111111. Additionally, for example, a maximum length of the codeword for the x-axis prefix information may be determined based on the above-described Equation 14. Additionally, for example, the width of the low-frequency transform coefficient region is equal to 32, and a maximum length of the codeword for the x-axis prefix information may be determined based on the above-described Equation 15. According to the embodiment, the prefix codeword may be a truncated rice code that is based on a truncated rice binarization process.

Additionally, for example, the decoding apparatus may perform bypass-based decoding on a syntax element that is coded based on a bypass. That is, the decoding apparatus may perform decoding, based on a uniform probability distribution, on the syntax element being coded based on bypass. The syntax element being coded based on bypass may include last significant coefficient suffix information related to a position of a last significant transform coefficient, among the transform coefficients for the current block. The significant coefficient suffix information may include the x-axis suffix information and the y-axis suffix information.

The decoding apparatus derives transform coefficients for the current block based on the decoded syntax elements (S1320). The decoding apparatus may derive a transform coefficient level (i.e., value or size) of the transform coefficient based on the values of the decoded syntax elements related to the transform coefficient levels of the transform coefficients. The syntax elements related to the transform coefficient levels may include the significant coefficient flag, the parity level flag, the first transform coefficient level flag, the second transform coefficient level flag, and/or information related to the coefficient value(s). Additionally, the residual information may include a sign flag indicating a sign of the transform coefficient. The decoding apparatus may derive a sign of the transform coefficient based on the sign flag. A syntax element indicating the sign flag may be coeff_sign_flag. For example, the decoding apparatus may derive the transform coefficient(s) based on the transform coefficient level of the transform coefficient and the sign.

Meanwhile, the decoding apparatus may derive the transform coefficients by performing transform coefficient scanning. That is, the transform coefficients may be derived in accordance with the scanning order. Herein, for example, among the transform coefficients for the current block, transform coefficient scanning may be performed for the transform coefficients being related to the low-frequency transform coefficient region. Additionally, for example, the transform coefficient scanning may not be performed for the transform coefficients being related to the high-frequency transform coefficient region. That is, transform coefficient scanning may not be performed for the transform coefficients being related to the high-frequency transform coefficient region, and the transform coefficient level may be determined to be equal to 0. Determining the transform coefficients being related to the high-frequency transform coefficient region to have a transform coefficient level of 0 may indicate that zeroing is being applied to the transform coefficients. That is, zeroing may be applied to the transform coefficients being related to the high-frequency transform coefficient region. Herein, a number of transform coefficients having zeroing applied thereto may be determined based on the width of the low-frequency transform coefficient region or the height of the low-frequency transform coefficient region.

The decoding apparatus derives residual samples for the current block based on the transform coefficients (S1330). For example, the decoding apparatus may derive residual samples for the current block based on the transform coefficients.

For example, in case it is derived that transform is not applied on the current block based on the transform skip flag, the decoding apparatus may derive the transform coefficients as the residual samples of the current block. For example, in case it is derived that transform is not applied on the current block based on the transform skip flag, the decoding apparatus may dequantize the transform coefficients so as to derive the residual samples of the current block. Alternatively, for example, in case it is derived that transform is applied on the current block based on the transform skip flag, the decoding apparatus may perform inverse transform on the transform coefficients so as to derive the residual samples of the current block. Alternatively, for example, in case it is derived that transform is applied on the current block based on the transform skip flag, the decoding apparatus may dequantize the transform coefficients and may perform inverse transform on the dequantized transform coefficients, so as to derive the residual samples of the current block.

The decoding apparatus generates a recovery picture based on the residual samples (S1340).

For example, the decoding apparatus may derive prediction samples by performing an inter prediction mode or an intra prediction mode on the current block based on prediction information, which is received through a bitstream. And, then, the decoding apparatus may generate the recovery picture by adding the prediction samples and the residual samples. Additionally, for example, the prediction information may include information indicating an intra prediction mode of the current block. The decoding apparatus may derive the intra prediction mode of the current block based on the information indicating an intra prediction mode of the current block and may derive reference samples of the current block and prediction samples of the current block, based on the intra prediction mode. The reference samples may include top-side reference samples and left-side reference samples of the current block. For example, in case the size of the current block is N×N, and, in a top-left sample position of the current block, in case an x-component is 0 and a y-component is 0, the left-side reference samples may be p[−1][0] to p[−1][2N−1], and the top-side reference samples may be p[0][−1] to p[2N−1][−1].

Thereafter, as needed, in order to enhance subjective/objective picture quality, an in-loop filtering procedure, such as de-blocking filtering, SAO and/or ALF procedures, may be applied to the recovery picture. And, this has already been described above.

Figure 14:
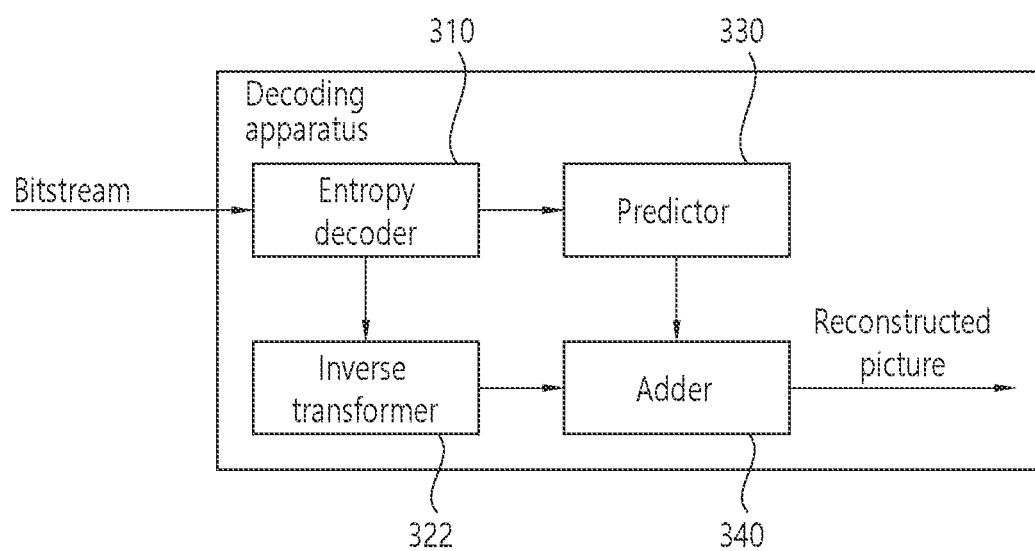
FIG. 14 broadly shows a decoding apparatus performing an image decoding method according to the present specification.

FIG. 14 broadly shows a decoding apparatus performing an image decoding method according to the present specification. The method disclosed in FIG. 13 may be performed by a decoding apparatus, which is disclosed in FIG. 14. More specifically, for example, an entropy decoder of the decoding apparatus of FIG. 14 may perform S1300 to S1310 of FIG. 13, a dequantizer and an inverse transformer of the decoding apparatus of FIG. 14 may perform S1320 to S1330 of FIG. 13, and an adder of the decoding apparatus of FIG. 14 may perform S1340 of FIG. 13. Additionally, although it is not shown in the drawing, a process of obtaining prediction information of the current block through a bitstream may be performed by the entropy decoder of the decoding apparatus of FIG. 14. And, a process of deriving a prediction sample for the current block based on the prediction information may be performed by a predictor of the decoding apparatus of FIG. 14.

As described above, according to the present specification, efficiency of residual coding may be enhanced.

Additionally, according to the present specification, residual coding efficiency may be enhanced by coding a transform coefficient based on high frequency zeroing.

Additionally, according to the present specification image coding efficiency may be enhanced by coding position information of a last significant coefficient within a current block (or current transform block) based on high frequency zeroing.

Furthermore, according to the present specification, throughput of CABAC may be enhanced by performing more efficient encoding after determining a context model on position information of a last significant transform coefficient based on a size of a high frequency zeroing region (i.e., a region where high frequency zeroing is not applied), and by reducing a number of context-coded bins.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, and so on) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 15:
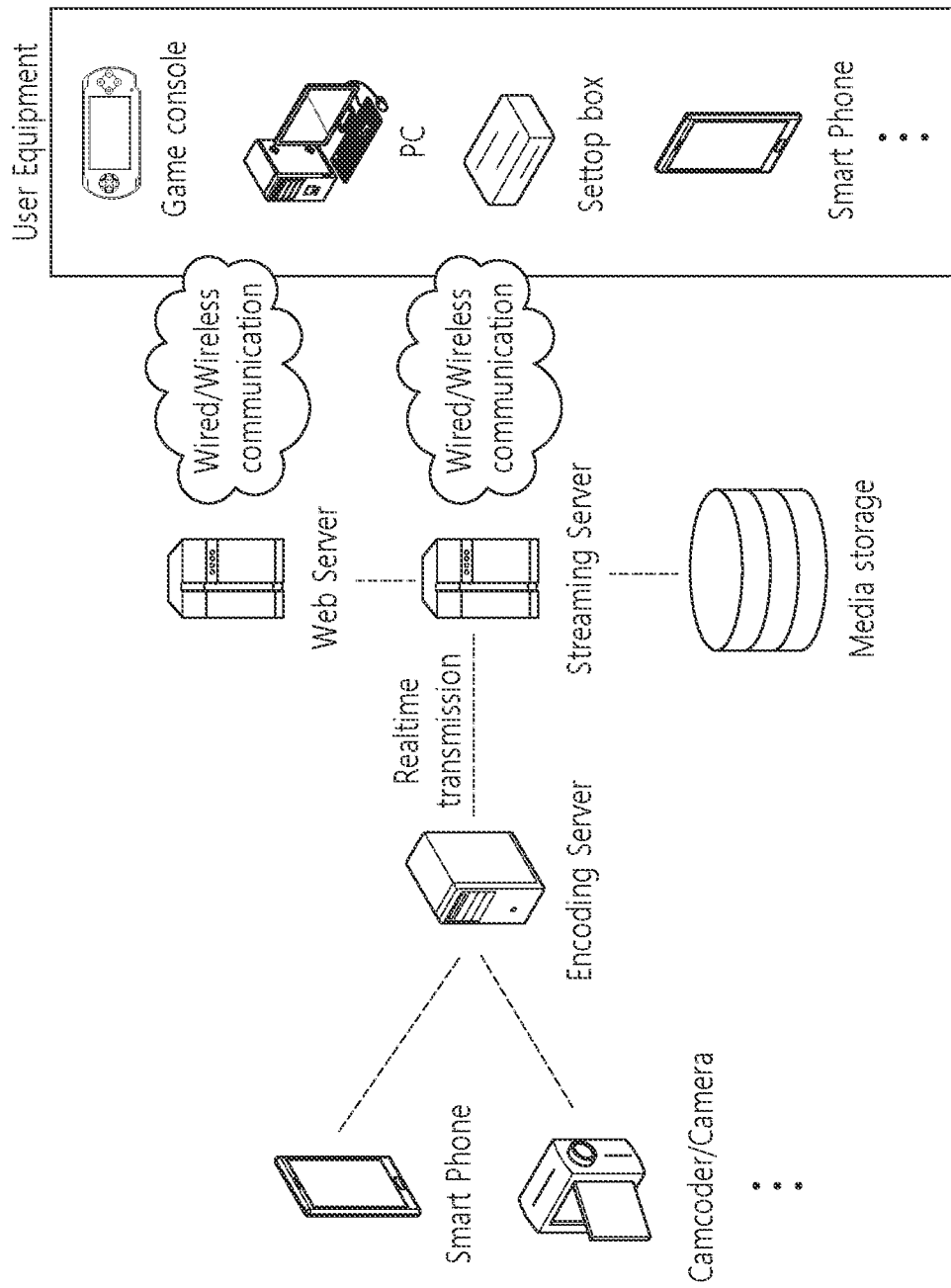
FIG. 15 illustrates a structural diagram of a contents streaming system to which the present disclosure is applied.

FIG. 15 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, and so on. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., Smartwatches, smart glasses, head mounted displays), digital TVs, desktops computer, digital signage, and the like. Each server in the content streaming system may be operated as a distributed server, in which case data received from each server may be distributed.

What is claimed is:

1. An image decoding method performed by a decoding apparatus, comprising:
receiving a bitstream including residual information of a current block;
decoding syntax elements for the current block included in the residual information;
deriving transform coefficients for the current block based on the decoded syntax elements;
deriving residual samples for the current block based on the transform coefficients; and
generating a reconstructed picture based on the residual samples,
wherein each of the transform coefficients for the current block is related to a high-frequency transform coefficient region consisting of zero transform coefficients or a low-frequency transform coefficient region including at least one significant transform coefficient,
wherein the syntax elements include last significant coefficient prefix information for a position of a last significant transform coefficient among the transform coefficients for the current block,
wherein a context model for the significant coefficient prefix information is derived based on a height and width of the low-frequency transform coefficient region,
wherein the residual information includes a coded subblock flag representing whether transform coefficient levels of transform coefficients for a subblock within the current block is equal to 0, and
wherein the subblock is related to a low-frequency transform coefficient region.

2. The image decoding method of claim 1,
wherein, among the transform coefficients for the current block, transform coefficient scanning is performed for the transform coefficients being related to the low-frequency transform coefficient region, and
wherein the transform coefficient scanning is not performed for the transform coefficients being related to the high-frequency transform coefficient region.

3. The image decoding method of claim 1,
wherein a width of the low-frequency transform coefficient region or a height of the low-frequency transform coefficient region is equal to or less than 32.

4. The image decoding method of claim 3,
wherein, based on a determination that the width of the current block is less than 32, the width of the low-frequency transform coefficient region is determined to be the same as the width of the current block,
wherein, based on a determination that the height of the current block is less than 32, the height of the low-frequency transform coefficient region is determined to be the same as the height of the current block,
wherein, based on a determination that the width of the current block is equal to or greater than 32, the width of the low-frequency transform coefficient region is determined to be equal to 32, and
wherein, based on a determination that the height of the current block is equal to or greater than 32, the height of the low-frequency transform coefficient region is determined to be equal to 32.

5. The image decoding method of claim 4, wherein, the width of the low-frequency transform coefficient region and the height of the low-frequency transform coefficient region are determined based on the following equation:

$$\log 2(ZoTbWidth) = \text{Min}(\log 2(TbWidth), 5)$$

$$\log 2(ZoTbHeight) = \text{Min}(\log 2(TbHeight), 5)$$

Wherein the ZoTbWidth represents the width of the low-frequency transform coefficient region, wherein the ZoTbHeight represents the height of the low-frequency transform coefficient region, wherein the TbWidth represents the width of the current block, and wherein the TbHeight represents the height of the current block.

6. The image decoding method of claim 1,
wherein the syntax elements include last significant coefficient suffix information related to the position of the last significant transform coefficient,
wherein the position of the last significant transform coefficient is determined based on a prefix codeword indicating the last significant coefficient prefix information and the last significant coefficient suffix information, and
wherein a maximum length of the prefix codeword is determined based on a size of the low-frequency transform coefficient region.

7. The image decoding method of claim 6,
wherein the last significant coefficient prefix information includes x-axis prefix information and y-axis prefix information, and wherein the prefix codeword is a codeword for the x-axis prefix information or a codeword for the y-axis prefix information.

8. The image decoding method of claim 7,
wherein, based on a determination that the width of the low-frequency transform coefficient region is equal to 32, a maximum length of the codeword indicating the x-axis prefix information is determined to be equal to 9, and
wherein, based on a determination that the height of the low-frequency transform coefficient region is equal to 32, a maximum length of the codeword indicating the y-axis prefix information is determined to be equal to 9.

9. The image decoding method of claim 8,
wherein, based on a determination that the width of the current block is greater than 32, and that the width of the low-frequency transform coefficient region is equal to 32, a maximum binarized value of the codeword for the x-axis prefix information of the low-frequency transform coefficient region is determined as 111111111, and
wherein, based on a determination that the height of the current block is greater than 32, and that the height of the low-frequency transform coefficient region is equal to 32, a maximum binarized value of the codeword for the y-axis prefix information of the low-frequency transform coefficient region is determined as 111111111.

10. The image decoding method of claim 7,
wherein a maximum length of the codeword for the x-axis prefix information is determined based on the following equation:

$$cMax=(\log 2(\min(W1,W2))<<1)-1,$$

wherein cMax represents the maximum length of the codeword for the x-axis prefix information, wherein $W_1$ is a width of the current block, and wherein $W_2$ is a width of the low-frequency transform coefficient region.

11. The image decoding method of claim 7,
wherein a maximum length of the codeword for the y-axis prefix information is determined based on the following equation:

$$cMax=(\log 2(\min(H1,H2))<<1)-1$$

wherein cMax represents the maximum length of the codeword for the y-axis prefix information, wherein $H_1$ is a height of the current block, and wherein $H_2$ is a height of the low-frequency transform coefficient region.

12. An image encoding method performed by an encoding apparatus, comprising:
deriving residual samples for a current block;
deriving transform coefficients of the current block based on the residual samples; and
encoding residual information for the current block including syntax elements for the transform coefficients,
wherein each of the transform coefficients for the current block is related to a high-frequency transform coefficient region consisting of zero transform coefficients or a low-frequency transform coefficient region including at least one significant transform coefficient,
wherein the syntax elements include last significant coefficient prefix information for a position of a last significant transform coefficient among the transform coefficients for the current block,
wherein a context model for the significant coefficient prefix information is derived based on a height and width of the low-frequency transform coefficient region,
wherein the residual information includes a coded subblock flag representing whether transform coefficient levels of transform coefficients for a subblock within the current block is equal to 0, and
wherein the subblock is related to a low-frequency transform coefficient region.

13. A non-transitory decoder-readable storage medium storing a bitstream generated by a method, the method comprising:
deriving residual samples for a current block;
deriving transform coefficients of the current block based on the residual samples;
encoding residual information for the current block including syntax elements for the transform coefficients; and
generating the bitstream including the residual information,
wherein each of the transform coefficients for the current block is related to a high-frequency transform coefficient region consisting of zero transform coefficients or a low-frequency transform coefficient region including at least one significant transform coefficient,
wherein the syntax elements include last significant coefficient prefix information for a position of a last significant transform coefficient among the transform coefficients for the current block,
wherein a context model for the significant coefficient prefix information is derived based on a height and width of the low-frequency transform coefficient region,
wherein the residual information includes a coded subblock flag representing whether transform coefficient levels of transform coefficients for a subblock within the current block is equal to 0, and
wherein the subblock is related to a low-frequency transform coefficient region.

* * * * *